US012346383B1

(12) United States Patent
Shashanka et al.

(10) Patent No.: US 12,346,383 B1
(45) Date of Patent: Jul. 1, 2025

(54) METHODS AND SYSTEMS FOR CLUSTERING DOCUMENTS BASED ON SEMANTIC SIMILARITY

(71) Applicant: Concentric Software, Inc, San Mateo, CA (US)

(72) Inventors: Madhusudana Shashanka, Austin, TX (US); Bonnie Arogyam Varghese, Milpitas, CA (US); Leomart Crisostomo, Sunnyvale, CA (US); Shankar Subramaniam, Cupertino, CA (US); Sumeet Khirwal, Jamshedpur (IN)

(73) Assignee: CONCENTRIC SOFTWARE, INC, San Mateo, CA (US)

( * ) Notice: Subject to any disclaimer, the term of this patent is extended or adjusted under 35 U.S.C. 154(b) by 0 days.

(21) Appl. No.: 18/830,618

(22) Filed: Sep. 11, 2024

(51) Int. Cl.
*G06F 16/90* (2019.01)
*G06F 16/906* (2019.01)
*G06F 16/93* (2019.01)

(52) U.S. Cl.
CPC ............ *G06F 16/906* (2019.01); *G06F 16/93* (2019.01)

(58) Field of Classification Search
None
See application file for complete search history.

(56) References Cited

U.S. PATENT DOCUMENTS

| | | | |
|---|---|---|---|
| 9,667,720 B1 * | 5/2017 | Bent | G06F 16/273 |
| 11,204,830 B2 * | 12/2021 | Davis | G06F 16/182 |
| 11,240,307 B2 * | 2/2022 | Botes | G06F 3/0661 |
| 11,281,394 B2 * | 3/2022 | Hankins | G06F 3/0604 |
| 11,289,169 B2 * | 3/2022 | Kannan | G11C 16/3495 |
| 11,409,821 B1 * | 8/2022 | Pal | G06F 16/9035 |
| 11,526,727 B1 * | 12/2022 | Mitchell | G06F 16/906 |
| 11,722,455 B2 * | 8/2023 | Patel | H04L 67/1097 |
| | | | 370/392 |
| 11,734,169 B2 * | 8/2023 | Tumanova | G06F 3/0652 |
| | | | 711/103 |
| 11,741,003 B2 * | 8/2023 | Coleman | G06F 3/061 |
| | | | 711/103 |
| 11,755,626 B1 * | 9/2023 | Liu | G06F 16/2237 |
| | | | 707/738 |
| 12,197,390 B2 * | 1/2025 | Lee | G06F 3/0679 |
| 12,204,788 B1 * | 1/2025 | Bernat | G06F 3/0625 |
| 12,216,903 B2 * | 2/2025 | Lee | G06F 3/0647 |
| 12,229,437 B2 * | 2/2025 | Gao | G06F 11/1464 |

(Continued)

*Primary Examiner* — Eliyah S. Harper
(74) *Attorney, Agent, or Firm* — Evergreen Valley Law Group; Kanika Radhakrishnan

(57) ABSTRACT

Methods and systems for clustering documents according to semantic similarity are disclosed. The method includes generating an embedding for each of a plurality of documents to form a plurality of embeddings. Each embedding is indicative of a semantic representation for the corresponding document. The method includes segregating the plurality of embeddings into a plurality of shards. The method includes clustering one or more embeddings within each shard of the plurality of shards into the one or more first clusters. The one or more first clusters for each shard collectively constitute a plurality of first clusters. The method includes generating a plurality of second clusters across the plurality of shards, based, at least in part, on semantic similarity between the plurality of embeddings and the plurality of first clusters.

20 Claims, 9 Drawing Sheets

(56) References Cited

U.S. PATENT DOCUMENTS

| | | | | |
|---|---|---|---|---|
| 12,235,743 | B2* | 2/2025 | Lee | G06F 11/20 |
| 12,242,425 | B2* | 3/2025 | Miller | G06F 16/1748 |
| 2008/0040151 | A1* | 2/2008 | Moore | G16H 40/67 |
| | | | | 705/2 |
| 2010/0281078 | A1* | 11/2010 | Wang | G06F 16/217 |
| | | | | 715/764 |
| 2020/0089808 | A1* | 3/2020 | Liu | G06F 18/213 |
| 2021/0311914 | A1* | 10/2021 | Yang | G06F 16/162 |
| 2022/0182235 | A1* | 6/2022 | Tysor | G06F 16/9035 |
| 2022/0300558 | A1* | 9/2022 | Ravikumar | G06F 16/906 |
| 2022/0315035 | A1* | 10/2022 | Chernov | G01C 21/3896 |
| 2023/0072311 | A1* | 3/2023 | Oliner | G06F 16/3332 |
| 2023/0074771 | A1* | 3/2023 | Nefedov | G06F 16/9024 |
| 2024/0168999 | A1* | 5/2024 | Nefedov | G06F 16/9024 |

\* cited by examiner

METHODS AND SYSTEMS FOR CLUSTERING DOCUMENTS BASED ON SEMANTIC SIMILARITY

TECHNICAL FIELD

The present invention relates to clustering documents and, more particularly, to methods and systems for clustering documents based on semantic similarity.

BACKGROUND

The ever-increasing volume of documents generated by enterprises presents a significant challenge for security teams. Mid-sized enterprises can easily accumulate tens or hundreds of millions of documents. These documents encompass a wide variety of types, including reports, emails, invoices, contracts, and many others. The unstructured nature of this data poses significant challenges for security teams, who are tasked with ensuring that sensitive information is adequately protected while remaining accessible to authorized personnel. Therefore, it is important to organize a large amount of data for managing, securing, and effectively working with this data.

One crucial step in handling large document collections is to establish efficient organization methods. Traditional approaches rely on manual categorization, which becomes increasingly impractical as data volume grows. This labor-intensive process is prone to human error and inconsistencies, hindering efficient document retrieval and utilization.

Moreover, existing solutions leverage automatic document classification to handle large document collections. These systems, for example, can identify various document types like payslips, offer letters, or non-disclosure agreements. However, their effectiveness relies heavily on pre-existing document types for training purposes. Therefore, existing solutions fail to automatically detect the documents unique to a specific company's environment, as no readily available training data exists for such specialized formats.

As a result, traditional automated approaches may fail to accurately identify and categorize these unique documents, leading to disorganization and potential security risks. Hence, there exists a technological need for more efficient methods and systems for handling large amount of data for protecting and securing these documents efficiently.

SUMMARY

Various embodiments of the present disclosure provide methods and systems for clustering documents based on semantic similarity.

In an embodiment, a computer-implemented method is disclosed. The computer-implemented method performed by a server system includes generating an embedding for each of a plurality of documents to form a plurality of embeddings. Each embedding is indicative of a semantic representation for the corresponding document. The method includes segregating the plurality of embeddings into a plurality of shards. The method includes clustering one or more embeddings within each shard of the plurality of shards into one or more first clusters. The one or more first clusters for each shard collectively constitute a plurality of first clusters. The method includes generating a plurality of second clusters across the plurality of shards, based, at least in part, on semantic similarity between the plurality of embeddings and the plurality of first clusters. The number of clusters in the plurality of second clusters is less than the number of clusters in the plurality of first clusters.

In another embodiment, a server system is disclosed. The server system includes a memory configured to store instructions, a communication interface, and a processor configured to execute the instructions stored in the memory and thereby causing the server system to generate an embedding for each of a plurality of documents to form a plurality of embeddings. Each embedding is indicative of a semantic representation for the corresponding document. The server system is also caused to segregate the plurality of embeddings into a plurality of shards. The server system is also caused to clusterone or more embeddings within each shard of the plurality of shards into one or more first clusters. The one or more first clusters for each shard collectively constitute a plurality of first clusters. The server system is also caused to generate a plurality of second clusters across the plurality of shards, based, at least in part, on semantic similarity between the plurality of embeddings and the plurality of first clusters. The number of clusters in the plurality of second clusters is less than the number of clusters in the plurality of first clusters.

In an embodiment, a method for clustering documents according to semantic similarity across a plurality of entities is disclosed. The method performed by a server system includes generating an embedding for each of a plurality of documents associated with the plurality of entities to form a plurality of embeddings. Each embedding is indicative of a semantic representation for the corresponding document. The method includes segregating the plurality of embeddings into a plurality of shards for each of the plurality of entities. The method includes clustering one or more embeddings within each shard of the plurality of shards into one or more first clusters. The clustering the one or more embeddings is performed for each entity separately. The method includes aggregating the one or more first clusters of each shard across the plurality of entities to form a plurality of first clusters. The method also includes generating a plurality of second clusters across the plurality of shards, based, at least in part, on semantic similarity between the plurality of embeddings and the plurality of first clusters. The number of clusters in the plurality of second clusters is less than the number of clusters in the plurality of first clusters.

BRIEF DESCRIPTION OF THE FIGURES

For a more complete understanding of example embodiments of the present technology, reference is now made to the following descriptions taken in connection with the accompanying drawings in which.

Figure 1:
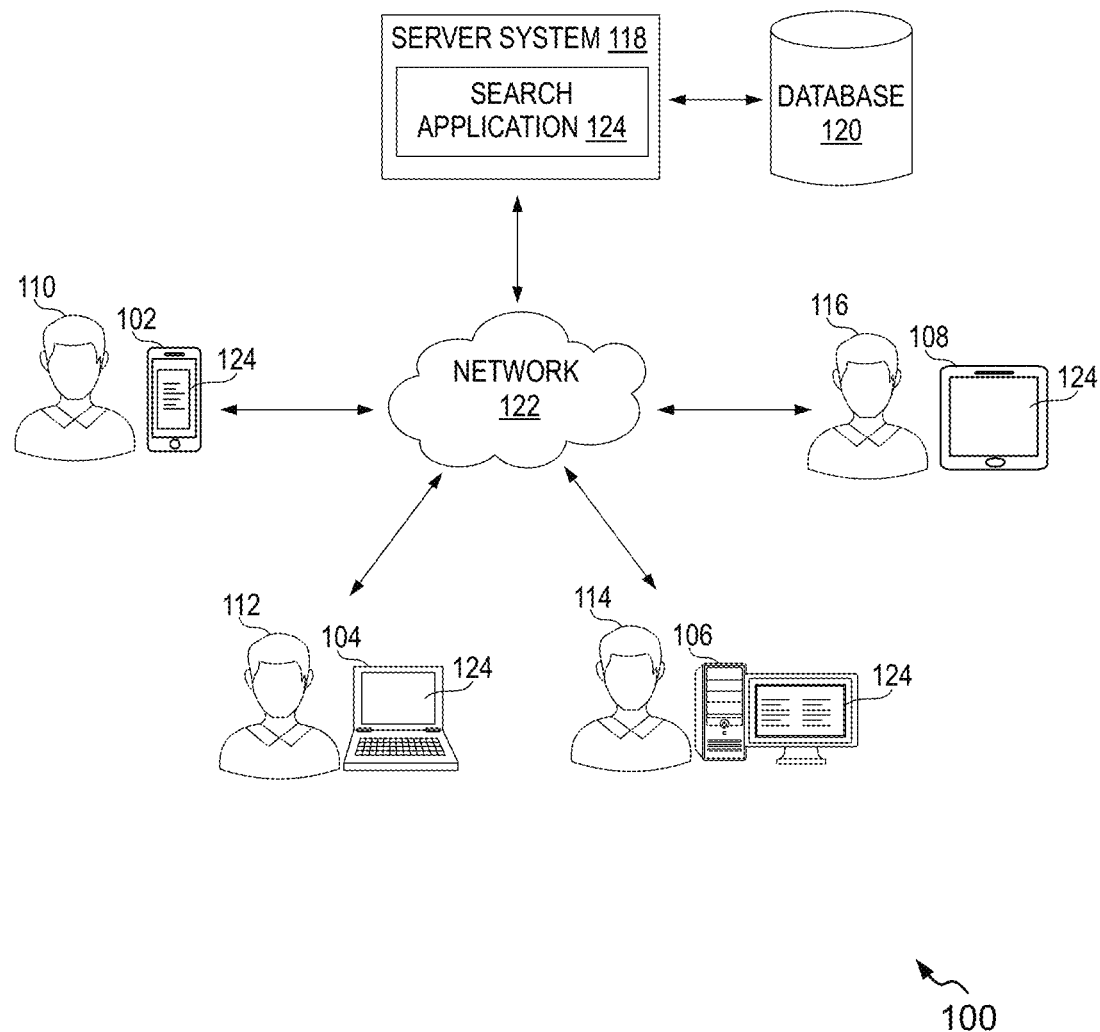
FIG. 1 is an example representation of an environment related to at least some examples of the present disclosure.

The drawings referred to in this description are not to be understood as being drawn to scale except if specifically noted, and such drawings are only exemplary in nature.

DETAILED DESCRIPTION

In the following description, for purposes of explanation, numerous specific details are set forth in order to provide a thorough understanding of the present disclosure. It will be apparent, however, to one skilled in the art that the present disclosure can be practiced without these specific details. In other instances, systems and methods are shown in block diagram form only in order to avoid obscuring the present disclosure.

Reference in this specification to "one embodiment" or "an embodiment" means that a particular feature, structure, or characteristic described in connection with the embodiment is included in at least one embodiment of the present disclosure. The appearance of the phrase "in one embodiment" in various places in the specification is not necessarily all referring to the same embodiment, nor are separate or alternative embodiments mutually exclusive of other embodiments. Moreover, various features are described which may be exhibited by some embodiments and not by others. Similarly, various requirements are described which may be requirements for some embodiments but not for other embodiments.

Moreover, although the following description contains many specifics for the purposes of illustration, anyone skilled in the art will appreciate that many variations and/or alterations to said details are within the scope of the present disclosure. Similarly, although many of the features of the present disclosure are described in terms of each other, or in conjunction with each other, one skilled in the art will appreciate that many of these features can be provided independently of other features. Accordingly, this description of the present disclosure is set forth without any loss of generality to, and without imposing limitations upon, the present disclosure.

The terms "document", "file", and "electronic document" may have been used interchangeably throughout the description. Unless the context suggests otherwise, these terms refer to a digital file that contains information formatted for electronic storage, retrieval, and display on various output devices such as computer, etc.

The terms "similarity distance" and "similarity metric" may have been used interchangeably throughout the description. Unless the context suggests otherwise, these terms refer to a metric used to measure how similar or dissimilar two data points (such as embedding, cluster, document, words, sentences, documents, or other objects) are. It quantifies the distance between them in a way that reflects their similarity: the smaller the distance, the more similar the two points are; the larger the distance, the less similar they are. In an example, a similarity distance metric can indicate the degree of semantic similarity between two documents. Various methods can be used to compute similarity distance, depending on the type of data and the specific application such as but not limited to Euclidean distance, cosine similarity, Jaccard similarity, Manhattan similarity, and hamming distance.

Overview

Various example embodiments of the present disclosure provide methods and systems to cluster documents based on semantic similarity. In particular, a unique approach is proposed for grouping documents based on their semantic meaning and extracting insights pertaining to such groups that help with protecting and securing these documents appropriately. The documents are clustered at multi-level in unique combination to effectively manage and organize the large set of documents. Initially, the documents are converted into corresponding embedding i.e., semantic representation and then all the embeddings are segregated into a plurality of shards. The segregation is done to divide the entire large dataset into small chunks of the predefined size. Upon segregation, the first level of clustering i.e., shard-level clustering is performed. In this clustering process, the embedding with each shard are clustered according to semantic similarity between the embeddings. The clustering in each shard is independent of other shards. As a result of the shard-level clustering, the plurality of first clusters are obtained across all the shards.

Then, a second level of clustering is performed on the plurality of first cluster to obtain a plurality of second clusters. In this clustering, the centroid of each of the plurality of first clusters is determined. Based on the determination of the centroids of each of the plurality of first clusters, semantic similarity between the plurality of clusters and the plurality of embeddings is determined and accordingly, a plurality of second clusters are generated. The second level of clustering further reduces the number of the clusters obtained as a result of first level clustering, thereby reducing the load on the processing system to handle this large set of documents.

In an embodiment, prior to performing thistwo-level clustering, a density-based clustering is conducted to find groups of files that are extremely similar to one another semantically. Then, such groups of files are reduced by choosing one file to represent the entire group of files. Thus, by initially reducing the dataset through density-based clustering, large volumes of data are handled more efficiently. Moreover, by substituting clusters of data points with core representatives, the computational load during the execution of this clustering method is significantly reduced.

Various embodiments of the present disclosure offer multiple advantages and technical effects. For instance, the proposed invention offers several significant advantages, particularly in the context of managing and securing large volumes of documents within an enterprise. One of the primary benefits is the ability to organize documents based on their semantic meaning. By grouping documents that share similar themes or topics, organizations can more easily categorize and manage their information. This not only improves the efficiency of data retrieval but also aids in uncovering patterns and relationships within the data.

Furthermore, the semantic grouping of documents provides critical insights that are essential for enhancing security measures. By understanding the content and context of each document, organizations can better identify which documents contain sensitive or confidential information and apply the appropriate security protocols. This targeted approach to document protection ensures that high-risk documents receive the necessary safeguards, reducing the likelihood of data breaches and unauthorized access. Additionally, this method supports compliance with regulatory requirements by ensuring that documents are appropriately classified and protected according to their content, thereby mitigating legal and financial risks associated with data mismanagement. Overall, the proposed invention enhances both the organization and security of large document collections, providing a robust solution for modern enterprise.

Moreover, the proposed invention also implements the mechanism to remove near-duplicate documents using cliques. Removing near-duplicate documents significantly improves data storage efficiency and retrieval speed. In large datasets, near-duplicates can consume substantial storage space and clutter search results, making it challenging to locate unique and relevant information quickly. By identifying and removing these near-duplicates, the system reduces redundancy, freeing up storage resources and ensuring that users can access the most pertinent documents without wading through repetitive content. This streamlined dataset not only enhances the user experience but also optimizes the performance of document management systems, leading to faster processing times and more efficient use of computational resources.

Further, the process of identifying and eliminating near-duplicate documents enhances the accuracy and reliability of data analysis and security measures and eliminates redundancy. When documents are grouped based on their semantic meaning, near-duplicates can distort the true representation of data clusters and obscure meaningful insights. By using cliques to identify and remove these near-duplicates, the system ensures that each cluster accurately reflects unique content, leading to more precise analysis and better decision-making.

Various embodiments of the methods and systems for clustering documents are described hereinafter with reference to FIG. 1 to FIG. 9.

FIG. 1 is an example representation of an environment 100 related to at least some examples of the present disclosure. Although the environment 100 is presented in one arrangement, other embodiments may include the parts of the environment 100 (or other parts) arranged otherwise depending on, for example, the way in which a server system 118 (interchangeably referred to as "system 118") facilitates clustering documents based on semantic similarity. The example representation of the environment 100 generally includes a plurality of user devices 102, 104, 106, and 108 associated with a plurality of users 110, 112, 114, and 116, a server system 118, and a database 120 connected to, and in communication with (and/or with access to) a wireless communication network (e.g., a network 122).

In the illustrated environment 100, the plurality of user devices 102-108 are depicted as a mobile phone, a laptop, a desktop computer, and a tablet respectively. However, the plurality of user devices 102-108 may include any other suitable electronic or computing device as well. For instance, the computing device may be, for example, a smartphone, a personal computer, an electronic tablet, a wearable device, a smart device such as a smart TV or smart appliance, etc.

In one example, the plurality of users 110-116 may perform exploratory searches over a large set of documents. The server system 118 allows the plurality of users 110-116 to provide input queries, where each query includes specific information required to fetch one or more clusters of documents. This functionality is crucial for efficiently navigating vast amounts of data, ensuring that users can quickly locate relevant information.

In an embodiment, upon receiving an input query from a user such as user 110, the server system 118 may process the query to identify and retrieve clusters of documents that match the information specified in the query. The clustering mechanism is based on advanced semantic analysis, which ensures that the documents within each cluster are contextually and thematically aligned with the query. This semantic clustering not only improves the precision of the search results but also provides users 110-116 with a comprehensive view of related documents, thereby facilitating deeper insights and more informed decision-making.

This method of organizing and searching documents greatly enhances the user's ability to conduct thorough exploratory searches within large document collections. By leveraging semantic clustering, the system offers a powerful tool for managing and extracting value from extensive datasets, improving user productivity and the overall efficiency of document retrieval processes.

It should be noted that the number of users and user devices described herein are only used for exemplary purposes and do not limit the scope of the invention. The main objective of the invention is to cluster documents based on their semantic meaning and extract insights pertaining to such groups that help with protecting and securing these documents.

The server system 118 may be deployed as a standalone server or can be implemented in the cloud as software as a service (SaaS). The server system 118 provides or hosts a search application 124 for enabling the plurality of users 110, 112, 114, and 116 to conduct thorough exploratory searches within large document collections. For example, the search application 124 may be a mobile application, a desktop application, a website, or a plugin in a third-party application. For example, the third-party application may be any existing search application facilitating the execution of tasks similar to that performed by the server system 118. In some embodiments, the search application 124 can be implemented as operating system extensions, modules, plugins, and the like. Further, the search application 124 may be operative in a cloud infrastructure, or the search application 124 may be executed within or as a virtual machine (VM) or virtual server that may be managed in the cloud infrastructure.

The server system 118 is embodied in at least one computing device in communication with the network 122 and/or embodied in at least one non-transitory computer-readable media. For example, an instance of the search application 124 is accessible to the user devices 102-108, as shown in the environment 100 in FIG. 1. This enables the plurality of users 110-116 to be able to access the server system 118 on the user devices 102-108. The search application 124 is a set of computer-executable codes configured to provide user interfaces (UIs) enabling the plurality of users 110-116 to conduct thorough exploratory searches within large document collections and retrieve the relevant datasets for the query inputted on the search application 124. In an embodiment, the server system 118 may provide the search results through the search application 124, in response to a query received from the user devices 102-108 via the network 122. In another embodiment, the search application 124 may be factory-installed on the user devices 102-108.

The network 122 may include, without limitation, a light fidelity (Li-Fi) network, a local area network (LAN), a wide area network (WAN), a metropolitan area network (MAN), a satellite network, the Internet, a fiber optic network, a coaxial cable network, an infrared (IR) network, a radio frequency (RF) network, a virtual network, and/or another suitable public and/or private network capable of supporting communication among the entities illustrated in FIG. 1, or any combination thereof.

Various entities in the environment 100 may connect to the network 122 in accordance with various wired and wireless communication protocols, such as Transmission Control Protocol and Internet Protocol (TCP/IP), User Datagram Protocol (UDP), 2nd Generation (2G), 3rd Generation (3G), 4th Generation (4G), 5th Generation (5G) communication protocols, Long Term Evolution (LTE) communication protocols, any future communication protocol, or any combination thereof. The network 122 may include, without limitation, a local area network (LAN), a wide area network (WAN) (e.g., the Internet), a mobile network, a virtual network, and/or another suitable public and/or private network capable of supporting communication among two or more of the entities illustrated in FIG. 1, or any combination thereof. For example, the network 122 may include multiple different networks, such as a private network made accessible by the user devices 102-108, the server system 118, and the database 120 separately, and/or a public network (e.g., the Internet) through which the user devices 102-108, the server system 118, and the database 120 may communicate.

In one embodiment, the server system 118 is configured to perform one or more of the operations described herein. In particular, the server system 118 is configured to obtain a large set of documents for clustering in various ways. For instance, an operator (user operating the server) can directly upload the set of documents to the server system 118 through a web interface or an application. In another example, the server system 118 can be configured to interact with other systems and databases through application programming interfaces (APIs). This integration allows the server to automatically fetch documents from external sources such as enterprise content management systems, cloud storage services, or document repositories. In another example, the server system 118 can fetch documents directly from the database 120. In another example, the server system 118 can employ web crawling techniques to gather documents from specific websites or intranets. In another example, the server system 118 can be configured to process and extract documents from emails. By connecting to email servers and parsing attachments, the server system 118 can gather documents submitted via email. In another example, the server system 118 can use stream processing to continuously ingest documents from real-time data streams. This approach is suitable for scenarios where documents are generated continuously and need to be processed on-the-fly.

In an embodiment, the server system 118 may receive the plurality of documents including a plurality of contents in the electronic form. The plurality of contents may include but not limited to, text, images, audio, video, animations, and the like. The server system 118 is configured to extract raw text from the plurality of contents in the document and perform a character filtration on the raw text to eliminate predefined types of characters from the raw text. The raw text includes only characters of readable material without any graphical representation and objects. The raw text may include arrangement of text, spaces, line breaks, tabulation characters, etc. The predefined types of characters include but not limited to special non-ASCII characters, redundant whitespaces, and certain punctuation characters such as quotes, brackets, etc. Further, the server system 118 is configured to determine and eliminate word(s) and sentence(s) in the raw text extracted which do not correspond to the semantic representation of the document, to obtain the final raw text from the plurality of content. For example, if the semantic representation of the document pertains to finance then the words such as "biological solution", "reverberatory furnace", "livestock rearing", etc., which do not correspond to finance may be determined and eliminated from the raw text.

In an embodiment, the server system 118 is configured to receive the raw text extracted and determine that a number of extracted raw text meets a predefined threshold for the raw text. The predefined threshold for the raw text may be defined for example dynamically based on learning or may be manually defined. Further, the server system 118 is configured to generate a plurality of tokens by combining a set of the raw text extracted from the document and to generate the plurality of sentence blocks based on sentence splicing of the plurality of tokens. In an embodiment, the server system 118 is configured to determine embeddings for each sentence block of the plurality of sentence blocks.

The document embedding may represent a single document or a class of documents in the electronic form. For example, in an organization, the classes may include documents related to finance, documents related to management, documents related to technology, documents related to a legal domain, etc. The document embedding may be obtained by various techniques to determine the semantic representation of the document such as aggregating the embeddings of all the sentence blocks; a representative sentences technique; an outlier sentences exclusion technique and a semantic noise filtering technique.

Various machine learning (ML) and artificial intelligence (AI) models can be utilized to create document embeddings, which are vector representations of documents. These models are trained on predefined datasets to learn and generate accurate embeddings. The training datasets typically comprise a collection of documents along with their corresponding embeddings, allowing the models to learn the relationships and patterns within the text. By leveraging these trained models, document embeddings can effectively capture semantic information, enabling more efficient and meaningful analysis of textual data.

Thus, the server system 118 is configured to generate an embedding for each of a plurality of documents to form a plurality of embeddings. Each embedding is indicative of a semantic representation for the corresponding document. Upon generation of the plurality of embeddings, the server system 118 is configured to segregate the plurality of embeddings into a plurality of shards. The segregation divides the large number of embeddings into smaller datasets. In an embodiment, the segregation may involve distributing document embeddings into shards based on a predefined number of documents per shard. This number remains consistent across all shards, ensuring uniformity in the distribution. For instance, if the predetermined number is set to 1000, each shard will contain exactly 1000 documents and if the set has 100000 documents, then the documents can be segregated into hundred shards.

Upon segregation, two levels of clustering are performed to form a final set of clusters according to semantic similarity. In particular, upon segregation, the server system 118 performs a shard-level clustering. In shard-level clustering, the server system 118 is configured to cluster one or more embeddings within each shard of the plurality of shards into the one or more first clusters. The one or more first clusters for each shard collectively constitute a plurality of first clusters.

Upon performing a first level of clustering, the server system 118 is configured to generate a plurality of second clusters across the plurality of shards, based, at least in part, on semantic similarity between the plurality of embeddings and the plurality of first clusters. The number of clusters in the plurality of second clusters is less than the number of clusters in the plurality of first clusters. Thus, the second level clustering reduces the number of clusters obtained from the first level clustering.

The number and arrangement of systems, devices, and/or networks shown in FIG. 1 are presented as an example. There may be additional systems, devices, and/or networks; fewer systems, devices, and/or networks; different systems, devices, and/or networks; and/or differently arranged systems, devices, and/or networks than those shown in FIG. 1. Furthermore, two or more systems or devices shown in FIG. 1 may be implemented within a single system or device, or a single system or device is shown in FIG. 1 may be implemented as multiple, distributed systems or devices. In addition, the system 118 should be understood to be embodied in at least one computing device in communication with the network 122, which may be specifically configured, via executable instructions, to perform steps as described herein, and/or embodied in at least one non-transitory computer-readable media.

Figure 2:
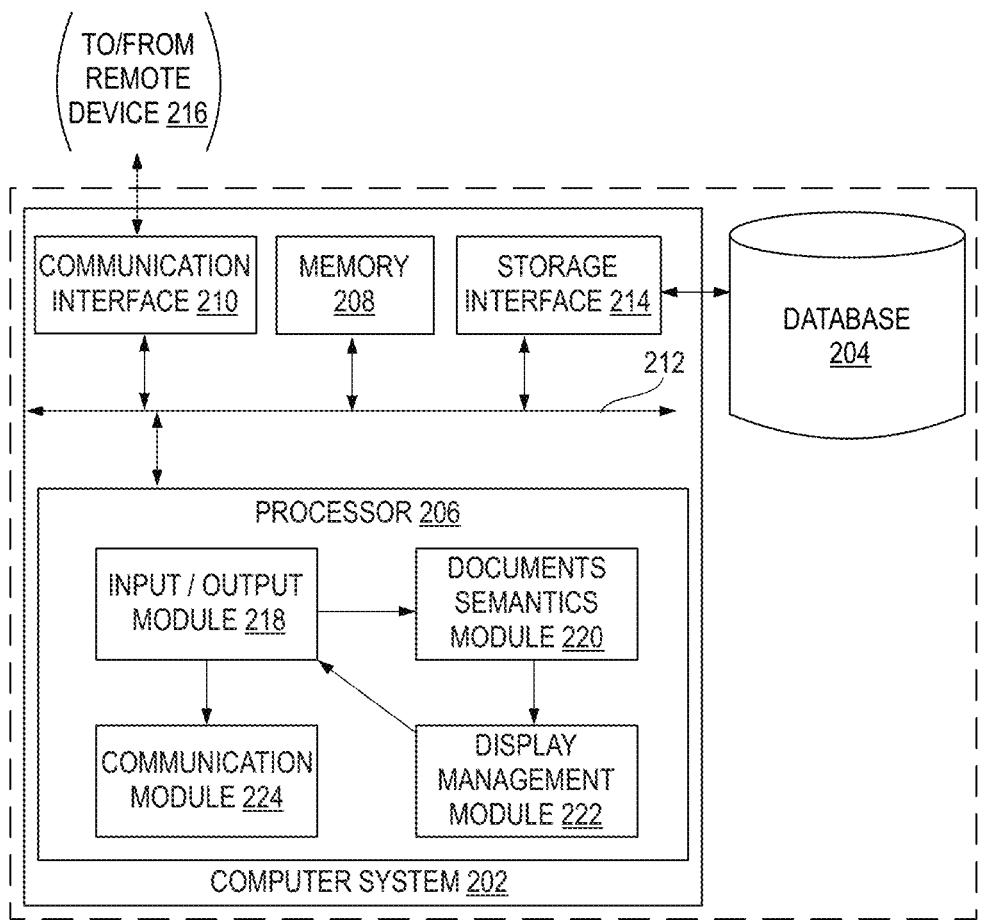
FIG. 2 is a simplified block diagram representation of a server system, in accordance with an embodiment of the present disclosure.

FIG. 2 is a simplified block diagram representation of a server system 200, in accordance with an embodiment of the present disclosure. The server system 200 is an example of the server system 118 depicted in FIG. 1. In some embodiments, the server system 200 is embodied as a cloud-based and/or SaaS-based (software as a service) architecture. The server system 200 is configured to facilitate clustering documents based on semantic similarity so as to retrieve clusters of documents that match the criteria specified in the query through the search application 124.

The server system 200 includes a computer system 202 and a database 204. The database 204 is an example of the database 120 of FIG. 1. The computer system 202 includes at least one processor 206 (hereinafter referred to as "processor") for executing instructions, a memory 208, a communication interface 210, and a storage interface 214 that communicate with each other via a bus 212.

In some embodiments, the database 204 is integrated into the computer system 202. For example, the computer system 202 may include one or more hard disk drives as the database 204. In one embodiment, the database 204 is integrated within the computer system 202 and configured to store an instance of the search application 124. Further, the storage interface 214 is any component capable of providing the processor 206 with access to the database 204. The storage interface 214 may include, for example, an Advanced Technology Attachment (ATA) adapter, a Serial ATA (SATA) adapter, a Small Computer System Interface (SCSI) adapter, a RAID controller, a SAN adapter, a network adapter, and/or any component providing the processor 206 with access to the database 204.

The processor 206 includes suitable logic, circuitry, and/or interfaces to execute computer-readable instructions for performing one or more operations for clustering documents based on semantic similarity. Examples of the processor 206 include but are not limited to, an application-specific integrated circuit (ASIC) processor, a reduced instruction set computing (RISC) processor, a complex instruction set computing (CISC) processor, a field-programmable gate array (FPGA), and the like. The memory 208 includes suitable logic, circuitry, and/or interfaces to store a set of computer-readable instructions for performing operations. Examples of the memory 208 include but are not limited to, a random-access memory (RAM), a read-only memory (ROM), a removable storage drive, a hard disk drive (HDD), and the like. It will be apparent to a person skilled in the art that the scope of the disclosure is not limited to realizing the memory 208 in the server system 200, as described herein. In another embodiment, the memory 208 may be realized in the form of a database server or cloud storage working in conjunction with the server system 200, without departing from the scope of the present disclosure.

The processor 206 is operatively coupled to the communication interface 210 such that the processor 206 is capable of communicating with a remote device 216 such as the user devices 102-108, or with any entity connected to the network 122 (as shown in FIG. 1). In an embodiment, the processor 206 is configured to facilitate the search application 124 on the user devices 102-108 for enabling a plurality of functionalities to the devices described in the disclosure.

It is noted that the server system 200 as illustrated and hereinafter described is merely illustrative of an apparatus that could benefit from embodiments of the present disclosure and, therefore, should not be taken to limit the scope of the present disclosure. It is noted that the server system 200 may include fewer or more components than those depicted in FIG. 2.

Further, in an embodiment, the server system 200 includes an input/output (I/O) module 218, a documents semantic module 220, a display management module 222, and a communication module 224. It should be noted that components, described herein, can be configured in a variety of ways, including electronic circuitries, digital arithmetic and logic blocks, and memory systems in combination with software, firmware, and embedded technologies. For example, the modules 218, 220, 222, and 224 can be implemented by processing circuitry such as logic gates, integrated circuits, microprocessors, microcontrollers, memory circuits, passive electronic components, active electronic components, optical components, hardwired circuits, or the like, and may optionally be driven by firmware. The circuits may, for example, be embodied in one or more semiconductor chips, or on substrate supports such as printed circuit boards and the like.

The I/O module 218 is configured to receive a large set of documents generated in an organization. For instance, I/O module 218 receives the plurality of documents including a plurality of contents in the electronic form. The plurality of contents may include but not limited to, text, images, audio, video, animations, and the like.

Upon receipt of the plurality of documents, the documents semantic module 220 may be configured to generate an embedding for each of a plurality of documents to form a plurality of embeddings. Each embedding is indicative of a semantic representation for the corresponding document. The embedding is a relatively low-dimensional space into which a high-dimensional vector is translated. The embedding captures some of the semantics of the sentence block by placing semantically similar sentence blocks close together in the embedding space. The document embedding determines the semantic representation of the document. Thus, the documents semantic module 220 may generate an embedding for each of a plurality of documents to form a plurality of embeddings. Each embedding is indicative of a semantic representation for the corresponding document.

In an embodiment, embeddings can optionally be processed to store in a reduced form by performing dimensionality reduction. This process is essential for managing high-dimensional data more efficiently and can improve both the performance and interpretability of clustering algorithms. By reducing the number of dimensions, the complexity of the data is lowered while retaining its essential structures and relationships. For dimensionality reduction, various non-linear manifold learning algorithms can be utilized. One prominent example is the Uniform Manifold Approximation and Projection (UMAP) algorithm, which is highly effective in preserving the global and local structure of the data. In a non-limiting example, UMAP can reduce the dimensionality of embeddings to a range of anywhere between 2 and 50 dimensions, making it a versatile choice for different use cases.

Upon generation of the plurality of embeddings, the documents semantic module 220 may be configured to segregate the plurality of embeddings into a plurality of shards. For instance, each shard may be capable of 1000 documents and then 100000 documents can be segregated into 100 shards. The shard generally partitions a large group of document embeddings into small groups or subgroups. For example, a set having 10 million documents may be further partitioned by 20 shards, each shard associated with 500,000 documents. More or less shards may be included to partition the large set of documents into subgroups of documents of any number. In an embodiment, the number of shards may depend on any or a combination of a number of the embeddings in the set, the size of the embedding i.e., memory space occupied by the embedding, type of the document, and so on. In another embodiment, the number of shards for the segregation may be a predefined number provided by the user.

Upon segregation, the documents semantic module 220 may perform a shard-level clustering i.e., clustering within each shard. In shard-level clustering, the server system 200 is configured to cluster one or more embeddings within each shard of the plurality of shards into the one or more first clusters. The one or more first clusters for each shard collectively constitute a plurality of first clusters.

In an aspect, the clustering in each shard is independent of clustering in other shards. Thus, the number of clusters in each shard may depend on the characteristics of the document in the corresponding shard and independent of clusters formed in the other shards.

According to aspects of the invention, the clustering within each shard may be executed according to a clustering algorithm applied to the embeddings within the shard. The clustering algorithm can include any one or a combination of spherical clustering, von Mises-Fisher clustering, and so on.

In an embodiment, in the clustering algorithm, the number of clusters in the plurality of first clusters may be set higher. This can lead to more detailed differentiation between data points i.e., document embeddings. The number of clusters in the plurality of first clusters is a tuning parameter. The parameter can be tuned to better capture the underlying structure between data points. For instance, the server system may set the value of this parameter to three orders of magnitude less than the number of embeddings in the shard. In other words, the ratio of number of embeddings to the number of clusters is maintained to 100:1. Thus, the number of clusters can be determined to 1/100th of the number of embeddings in the shard. In an example, techniques such as spherical k-means or von Mises-Fisher clustering can be used to perform shard-level clustering or a first level of clustering.

Upon performing a first level of clustering i.e., generation of the plurality of first clusters, the documents semantic module 220 may generate a plurality of second clusters across the plurality of shards. to generate a plurality of second clusters, the documents semantic module 220 may use clustering algorithms such as the nearest point algorithm and so on.

In an embodiment, the generating of the plurality of second clusters may be based, at least in part, on semantic similarity between the plurality of embeddings and the plurality of first clusters. In particular, the document semantic module 220 may determine a centroid for each of the plurality of first clusters. Based on the determination of the centroids of the plurality of first clusters, a further set of centroids is determined. In an exemplary embodiment, a further set of centroids is generated using the following two methods. Once the further set of centroids is generated, each embedding is assigned to one of these centroids based on the semantic characteristics between the embedding and the further set of centroids as described in the following methods. The number of centroids in the further set of centroids is less than the number of clusters in the plurality of first clusters (or the number of centroids determined for the plurality of first clusters).

Method-1 for the Second Level of Clustering

The hierarchical clustering algorithm builds a hierarchy of clusters by continuously merging the closest pairs of clusters. For instance, according to one of the clustering algorithms (hierarchical linkage algorithm), the documents semantic module 220 may determine a centroid for each of the plurality of first clusters. The centroid may be determined based on each embedding i.e. semantic representations of the corresponding cluster. In an example, the centroid may be determined as an average representation of the corresponding cluster, however, the same should not be construed as a limitation of the present disclosure. Other forms of computation methods for centroids such as a median-based centroid and the like are also covered within the scope of the present disclosure.

Once the centroid for each of the plurality of first clusters is determined, the documents semantic module 220 may determine a hierarchical structure for the plurality of first clusters. The hierarchical structure may indicate a hierarchical linkage among the centroids of the plurality of first clusters based on similarity distances among them. In an example, the hierarchical structure may be visually represented through a dendrogram, a tree-type structure formed through the similarity behaviors among the centroids. In the tree structure, each cluster may be represented by the leaf node. The similarity distance can include any one of angular cosine distance, Euclidean distance, Manhattan distance, and so forth. In a preferred embodiment, the similarity distance includes an angular cosine distance. In an embodiment, the hierarchical linkage can be represented through a distance matrix. The distance matrix can be a mathematical representation of a two-dimensional matrix.

The documents semantic module 220 may merge a certain pair of clusters of the plurality of first clusters based on the hierarchical linkage among them. These pairs of clusters are identified based on a predefined criterion. In an embodiment, these pairs of clusters should have a similarity distance exceeding a primary threshold. When the measured similarity distance between two clusters surpasses a certain threshold, it implies that the clusters are semantically similar enough. This high degree of similarity suggests that the two clusters contain related or overlapping information, making it appropriate to combine or merge them into a single cluster. If the similarity distance between the centroids does not exceed the threshold i.e., the pair of clusters are not sufficiently similar to each other, therefore, the pair of clusters should not be merged.

Once the clusters are merged and formed a new cluster, the documents semantic module 220 may recalculate the similarity distances between the newly formed cluster and all other clusters. The merged cluster is associated with a centroid. The centroid may be determined based on all the semantic representations of the corresponding cluster. In a non-limiting example, the centroid for the merged cluster can be computed as a weighted average of the centroids of the pair of clusters. In other words, upon merging, a set of merged clusters is formed and each merged cluster is associated with a centroid.

In one embodiment, the documents semantic module 220 may continue the merging process until a predefined number of clusters are formed. In another embodiment, the step of merging continues until the distance between the closest clusters exceeds the primary threshold. In the process of merging, the primary threshold plays an important role in determining the number of clusters to be present in the plurality of second clusters. In anon-limiting example, the primary threshold can be set to 0.95. Once the step of merging is completed, the centroids of the final set of clusters can be considered as the further set of centroids.

Upon merging, the documents semantic module 220 may assign each embedding to a cluster, among the set of merged clusters i.e., final set of clusters obtained as a result of merging, when the similarity distance between a centroid of the corresponding cluster and the corresponding embedding is more than a secondary threshold. Thus, the secondary threshold helps determine the specific cluster to which a document belongs, aiding in the final assignment of documents to clusters. On the other hand, the primary threshold facilitates the merging process by combining clusters that are similar enough according to this threshold.

Thus, as a result of this algorithm, a plurality of second clusters are generated based on the plurality of first clusters. The number of clusters in the plurality of second clusters is less than the number of clusters in the plurality of first clusters. Thus, the second level clustering reduces the number of clusters obtained from the first level clustering.

Method—2 for the Second Level of Clustering

In another clustering algorithm, for generating the plurality of second clusters based on the plurality of first clusters, a fixed set of data points can be used as centroids, instead of finding centroids from the data and then assigning documents into clusters based on the centroid they are closest to as described in Method-1 above.

For instance, the documents semantic module 220 may determine a set of reference centroids. In an embodiment, the documents semantic module 220 may select the set of reference centroids among centroids of the plurality of first clusters randomly. In another embodiment, the set of reference centroids may be determined using heuristics or initialization schemes such as but not limited to k-means++. The set of reference centroids can be considered as further set of centroids.

After determining the set of reference centroids, the next step is to assign each document embedding to the appropriate cluster or cluster centroid. Each document has a corresponding embedding i.e., a numerical representation that captures its semantic meaning. To decide which cluster a document belongs to, the algorithm calculates the distance between the document's embedding and each reference centroid.

The documents semantic module 220 may then select an embedding among the plurality of embeddings. In an example, the selection of the embedding is performed randomly.

Thus, upon selection of the document embedding, the documents semantic module 220 may calculate a similarity distance between the selected embedding and each of the set of reference centroids.

The documents semantic module 220 may select a reference centroid among the set of reference centroids based on the calculated similarity distances. The reference centroid is selected such that the selected reference centroid has a maximum similarity distance to the selected embedding compared to all other reference centroids in the set.

The documents semantic module 220 may assign the selected embedding to the selected reference centroid. The above process for selection of embedding and assignment is recursively performed or repeated until each embedding in the plurality of embeddings is assigned with one of the set of reference centroids.

Thus, each document is then assigned to the cluster with the closest centroid, i.e., the centroid with the smallest distance to the document's embedding. This ensures that each document is grouped with other documents that have similar semantic meanings. This process helps in organizing the documents into meaningful clusters based on their content.

Thus, in both the method-1 and method-2, the documents semantic module 220 may determine the centroids of each cluster in the plurality of first clusters and agglomerate these centroids to generate a plurality of second clusters. For instance, based on these centroids, a further set of centroids is determined to generate a plurality of second clusters. In method-1, the centroids i.e., a further set of centroids is determined dynamically based on the analysis of the dataset, whereas, in method-2, a further set of centroids is determined as fixed or static parameters. Thus, the proposed method facilitates reducing bias in the resulting clusters, ensuring consistent quality across all final clusters. Providing a novel way of clustering in two stages—shard-level clustering and then clustering across all the shards, prevents any one cluster from dominating due to a larger number of samples, promoting more equitable and representative clustering results. Further, the unique combination of clustering facilitates more accurate and stable clustering outcomes.

In an embodiment, the method for clustering documents according to semantic similarity can be performed across a plurality of entities (interchangeably referred to as a plurality of clients). For example, the generation of an embedding for each of the plurality of documents associated with the plurality of entities is performed, thereby generating a plurality of embeddings. The segregation of the embeddings into shards and shard-level clustering/first level clustering can be executed at the individual client levels. However, upon execution of the shard-level clustering at the individual client level, the shard-level centroids or all the first clusters across all clients are aggregated in a central repository. Accordingly, the second step of clustering is then executed on all shard-level centroids across clients instead of executing separately for each client. The resulting clusters provide a 'common cluster space' i.e. each cluster belongs to the corresponding semantic group irrespective of the client environment. Thus, the step of second-level clustering across all clients provides a uniform cluster space, allowing for a better understanding of each cluster due to the aggregated information from multiple client environments. Additionally, it enables the identification of clusters in semantic regions where a particular client environment may lack sufficient data.

In an embodiment, the server system 200 may compute a different set of metrics for the reliability of results, cluster validation, and decision-making. For instance, the server system 200 may assign a confidence level to each embedding in the plurality of second clusters. The confidence level for each embedding indicates the closeness between the embedding and a centroid of the corresponding cluster. The confidence level can be calculated by computing the similarity distance between a document embedding and a centroid of the associated cluster.

In another embodiment, the server system 200 may compute a tightness parameter for each cluster. The tightness may indicate how closely grouped the data points (or files) within a cluster are around the centroid or center point of that cluster. The tightness can be computed as an average of the similarity distances of all documents in the cluster to the centroid.

In an embodiment, the display management module 222 is configured to display the set of documents according to the input query. Further, the display management module 222 is also configured to display a message indicating whether the user is allowed to access the document. In an embodiment, along with the set of documents, the display management module 222 may display the values of metrics such as confidence level, tightness, etc., associated with the set of documents to be displayed.

In an embodiment, the documents in the large set are not static, as new documents are continuously received in shards. Thus, clustering is done in an online fashion, also referred to as online clustering or stream clustering. Upon receipt of every new shard, prior to initiating clustering, an embedding corresponding to each document in the new shard is generated and the embedding of the new shard is assigned to existing clusters from all the existing shards first.

Upon this assignment of the document embeddings, the clustering is performed in the same manner as described above. In particular, once the document embeddings are assigned to the existing clusters, the shard-level clustering is followed by clustering across all the shards to generate the final clusters. Thus, instead of waiting for the entire dataset to be processed, the algorithm starts providing results as soon as each shard is sufficiently populated. This allows for faster insights and quicker feedback, as partial results are available even before the whole process is complete.

In this manner, the proposed method is scalable because it can handle increasing amounts of data by processing documents in parallel across multiple shards. As each shard gets filled with documents, the algorithm can start producing results, providing early insights without waiting for the entire dataset to be processed. This approach enhances efficiency and speeds up the overall process.

At least one of the plurality of modules/components of the server system 200 may be implemented through AI model. A function associated with AI may be performed through memory and the processor.

The one or a plurality of processors controls the processing of the input data in accordance with a predefined operating rule or AI model stored in the non-volatile memory and the volatile memory. The predefined operating rule or artificial intelligence model is provided through training or learning. Being provided through learning means that, by applying a learning process to a plurality of learning data, a predefined operating rule or AI model of a desired characteristic is made. The learning may be performed in a device itself in which AI according to an embodiment is performed, and/or may be implemented through a separate system.

The AI model may consist of a plurality of neural network layers. Each layer has a plurality of weight values and performs a layer operation through calculation of a previous layer and an operation of a plurality of weights. Examples of neural networks include, but are not limited to, convolutional neural network (CNN), deep neural network (DNN), recurrent neural network (RNN), restricted Boltzmann Machine (RBM), deep belief network (DBN), bidirectional recurrent deep neural network (BRDNN), generative adversarial networks (GAN), transformers, attention networks, and deep Q-networks.

The learning process is a method for training a predetermined target device (for example, a robot) using a plurality of learning data to cause, allow, or control the target device to make a determination or prediction. Examples of learning processes include, but are not limited to, supervised learning, unsupervised learning, semi-supervised learning, or reinforcement learning.

Further, testing and validation of the scheme described above were conducted on hundreds of millions of records using various criteria. These criteria included Silhouette Score, Calinski-Harabasz Score, Davies-Bouldin Score, and Manual Qualitative Assessment.

Although FIG. 2 shows the hardware elements of the server system 200, it is to be understood that other embodiments are not limited thereon. In other embodiments, the server system 200 may include fewer or more number of elements. Further, the labels or names of the elements are used only for illustrative purposes and do not limit the scope of the invention. One or more components can be combined to perform the same or substantially similar function.

Figure 3:
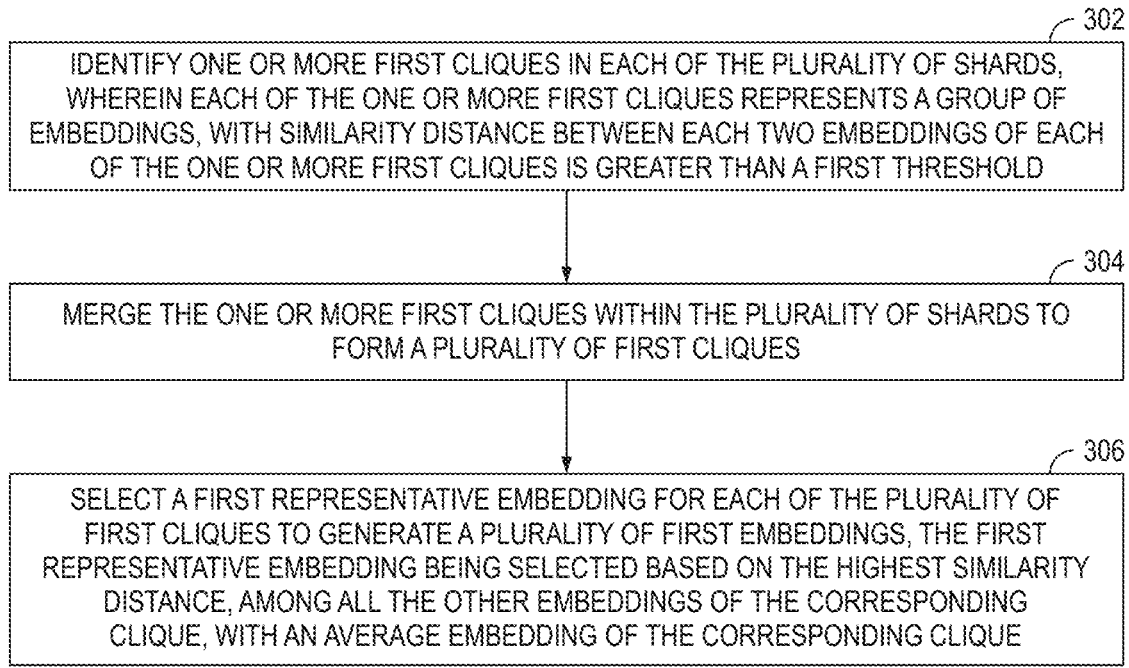
FIG. 3 illustrates a flow chart illustrating a method for performing density-based clustering to identify the groups of files that are extremely similar to one another semantically within the shard, in accordance with an embodiment of the present disclosure.

FIG. 3 illustrates a flow chart illustrating a method 300 for performing density-based clustering to identify the groups of files that are extremely similar to one another semantically within the shard, in accordance with an embodiment of the present disclosure. Herein, the server system 118 is described with reference to FIG. 1. Operations of a method 300, and combinations of the operations in the method 300, may be implemented by, for example, hardware, firmware, a processor, circuitry, and/or a different device associated with the execution of software that includes one or more computer program instructions. The sequence of operations of the method 300 may not be necessarily executed in the same order as they are presented. Further, one or more operations may be grouped and performed in the form of a single step, or one operation may have several sub-steps that may be performed in parallel or a sequential manner.

The method for density-based clustering is executed prior to performing shard-level clustering i.e., prior to forming the plurality of first clusters. The method can use density-based clustering algorithms such as but not limited to Density-based spatial clustering of applications with noise (DBSCAN) and Hierarchical Density-Based Spatial Clustering of Applications with Noise (HDBSCAN). The method 300 describes an algorithm for performing density-based clustering and starts from 302.

At step 302, the server system 118 can identify one or more first cliques in each of the plurality of shards. Since one or more first cliques are identified within each shard, therefore, the one or more first cliques can be referred to as shard-level cliques. The identification of the one or more first cliques in each shard is executed independently i.e., the cliques in one shard are independent of the other shard. Further, the number of cliques in each shard may also vary.

The server system 118 may determine the similarity distance between embeddings of each shard and compare the similarity distance with a first threshold to identify one or more cliques in the shard. In an example, the one or more cliques can be identified using density-based spatial clustering of applications with noise (DBSCAN). Each of the one or more first cliques may represent a group of embeddings having similar context or similar content. In an embodiment, for any given point(interchangeably referred to as "embedding") in the clique, there should be at least one other point in the cluster where the similarity distance is greater than the threshold. In one embodiment, each of the first cliques may have a plurality of embeddings such that for a boundary point in the clique, the similarity distance between the boundary point and at least one other embedding in the clique is greater than the first threshold. For points that are not located at the boundary of the clique, there should be at least two other points in the cliques with similarity distance greater than threshold.

At step 304, the server system 118 can merge the one or more first cliques within the plurality of shards to form a plurality of first cliques. In this step 304, cliques across all the shards are analyzed uniformly. The one or more first cliques are merged within the plurality of shards to form a plurality of first cliques. The merging process starts with a pair of shards. In particular, the server system 118 may select one or more first cliques in a pair of shards among the plurality of shards and generate one or more intermediate first cliques from the one or more first cliques of the pair of shards. For instance, the server system 118 may select the first shard and the second shard as a pair of shards and then generate the intermediate first cliques by merging and/or adding the cliques of the first shard and the second shard according to the predefined criterion.

In one embodiment, the server system 118 may merge cliques from the first and second shards that satisfy a predefined criterion. Cliques from the first and second shards that do not meet this criterion will not be merged and are instead added to intermediate cliques. All merged and added cliques collectively form the intermediate first cliques. In this context, merging refers to combining two cliques into a single clique, whereas adding refers to including cliques into the final group without merging them.

In an embodiment, according to the predefined criterion, the server system 118 may merge two cliques if the similarity distance between at least one embedding of one clique and each of at least two embeddings of another clique is higher than the first threshold. For example, in order to merge two cliques A and B, there should be some point in B for which there are at least two points in A with a similarity distance higher than the first threshold. This threshold may be set to very high (very close to 1) so that only highly similar cliques are merged.

Upon generation of the one or more intermediate first cliques, the server system 118 may update the one or more intermediate first cliques by merging and/or adding the one or more intermediate first cliques with the one or more first cliques of at least one shard of the remaining shards in the plurality of shards according to the above-mentioned predefined criterion. For instance, the cliques of the intermediate first cliques may be merged and/or added to the cliques of the third shard. In particular, the server system 118 may merge the cliques of the intermediate first cliques with the cliques of the third shard that satisfy the predefined criterion. The remaining cliques of the intermediate first cliques and the cliques of the third shard may not be merged and may be simply added to the merged cliques to update the intermediate first cliques. Each instance, when a new shard is taken into account to update the intermediate first cliques, all the merged and non-merged cliques form the updated intermediate first cliques. In some embodiments, only merged cliques or only non-merged cliques are formed depending on whether the condition of the predefined criterion is met or not. The step of updation is sequentially repeated for each remaining shard so that cliques of all the shards are combined.

For example, the server system 118 may consider the first shard and the second shard. Cliques that meet the predefined criterion can be merged into a single clique, whereas the cliques that do not meet the predefined criterion do not get merged. Upon applying the predefined criterion on the cliques of the first and second shards, merged and non-merged cliques may form the intermediate cliques. Now, the server system 118 may merge the intermediate cliques with the cliques of the third shard in the same manner as explained above for merging the cliques of the first and second shards to update the intermediate first cliques. This process is repeated with the fourth shard and subsequent shards until cliques from all shards have been analyzed for merging.

At step 306, the server system 118 may select a first representative embedding for each of the plurality of first cliques to form a plurality of first embeddings. There are a plurality of embeddings in each clique. Among the plurality of embeddings, one embedding is selected as a first representation embedding (interchangeably referred to as "core point"). Various algorithms can be employed to identify a representative sample file from these groups. The first representative embedding may be selected based on the highest similarity distance, among all the embeddings of the corresponding clique, with an average embedding of the corresponding clique. In an example, initially, a centroid i.e., average embedding of all embeddings in the group, is calculated, and then similarity distance between the centroid and each embedding is determined. Among all the embeddings, the embedding that has the highest similarity with the centroid is selected as the representative sample.

Figure 4:
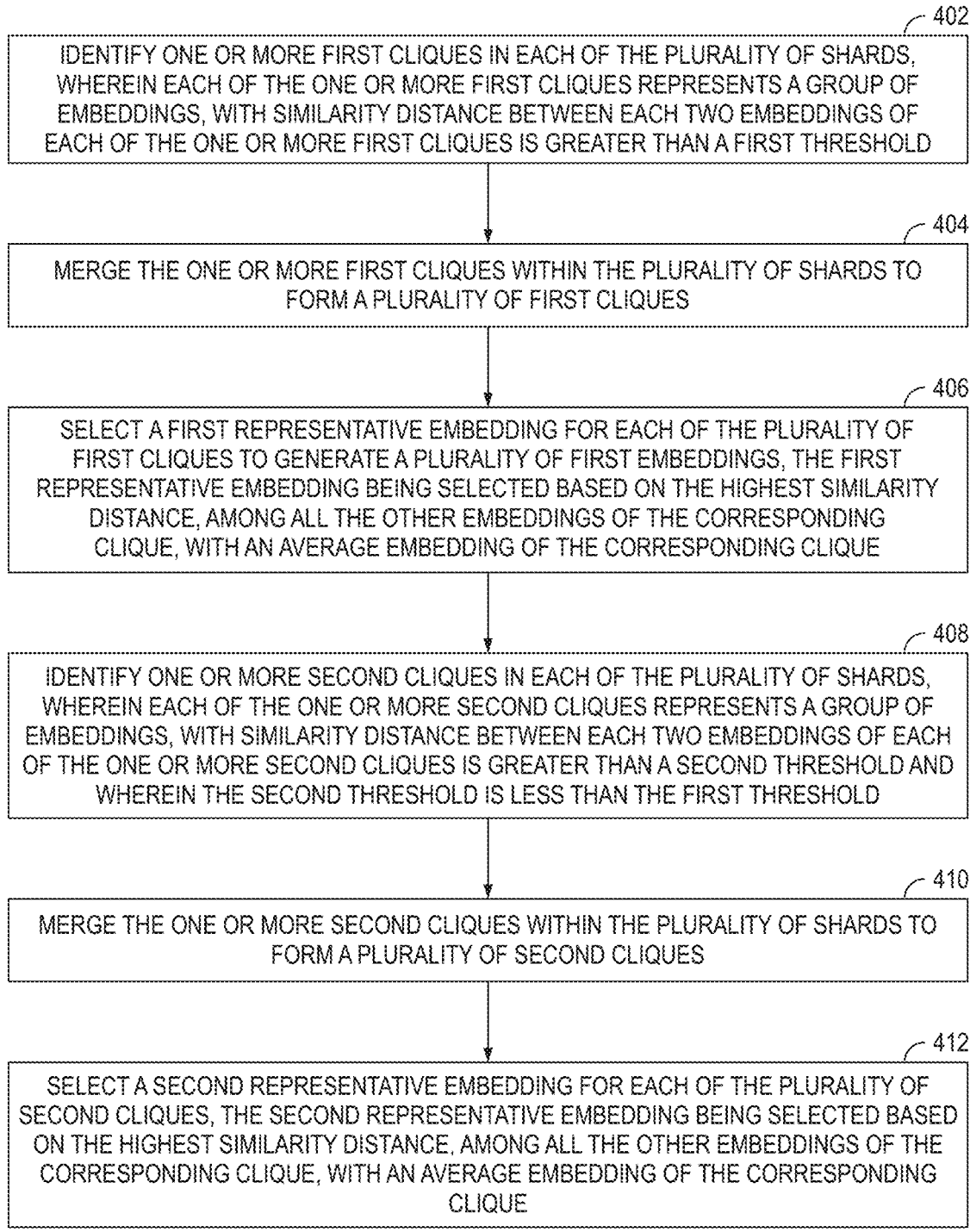
FIG. 4 illustrates a flow chart illustrating a method for performing density-based clustering to identify the groups of files that are extremely similar to one another semantically with multiple granularities, in accordance with an embodiment of the present disclosure.

FIG. 4 illustrates a flow chart illustrating a method for performing density-based clustering to identify the groups of files that are extremely similar to one another semantically with multiple granularities, in accordance with an embodiment of the present disclosure. The server system 118 is described with reference to FIG. 1. Operations of the method 400, and combinations of the operations in the method 400, may be implemented by, for example, hardware, firmware, a processor, circuitry, and/or a different device associated with the execution of software that includes one or more computer program instructions. The sequence of operations of the method 400 may not be necessarily executed in the same order as they are presented. Further, one or more operations may be grouped and performed in the form of a single step, or one operation may have several sub-steps that may be performed in parallel or a sequential manner.

The method 300, as described above with reference to FIG. 3, can be executed at various granularities using multiple threshold levels, as exemplified by method 400. Initially, the density-based clustering is performed at the higher threshold. Once the density-based clustering is executed at the higher threshold, the threshold may be lowered and the same method 300 is repeated for the lowered threshold.

The method 400 starts with step 402. At step 402, similar to step 302, the server system 118 may identify one or more first cliques in each of the plurality of shards. Each of the one or more first cliques may represent a group of embeddings having similar context or similar content. In one embodiment, the first cliques may have a plurality of embeddings such that the similarity distance between each embedding with at least one embedding within the clique is greater than a first threshold.

At step 404, similar to step 304, the server system 118 may merge the one or more first cliques within the plurality of shards to form a plurality of first cliques.

At step 406, similar to step 306, the server system 118 may select a first representative embedding for each of the plurality of first cliques to generate a plurality of first embeddings. The first representative embedding may be selected based on the highest similarity distance, among all the embeddings of the corresponding clique, with an average embedding of the corresponding clique. In an example, initially, a centroid i.e., the average embedding of all embeddings in the group, is calculated, and similarity distance between the centroid and each embedding is determined. Among all the embeddings, the embedding having the highest similarity distance with the centroid is selected as the representative sample.

Once such near-duplicate groups of files have been reduced by retaining the representative document (interchangeably referred to as "core point"), the density-based clustering may be performed again on the remainder of the data but with a relaxed similarity threshold. In other words, the density-based algorithm is executed for a lowered threshold (e.g., 0.95-0.98).

At step 408, the server system 118 may identify one or more second cliques among the plurality of first embeddings. The identification of the one or more second cliques is similar to the identification of one or more first cliques, as indicated in step 302. Thus, the identified second cliques can also be referred to as shard-level cliques as the one or more second cliques are identified within the shard.

Each of the one or more second cliques may represent a group of embeddings having similar characteristics such as but not limited to, similar content or similar context. In one embodiment, the second cliques may have a plurality of embeddings such that the similarity distance between each embedding with at least one embedding within the clique is greater than a second threshold. The second threshold is less than the first threshold. For example, the second threshold can be 0.970, whereas the first threshold is 0.999.

At step 410, the server system 118 may merge the one or more second cliques within the plurality of shards to form a plurality of second cliques. The merging of the one or more second cliques is similar to the merging of one or more first cliques as specified in step 304. Thus, as a result of merging of the one or more second cliques, intermediate second cliques are formed through application of the predefined criterion. However, in this case, the threshold for the predefined criterion is the second threshold lower than the first threshold. Thus, by lowering the similarity threshold, cliques (groups of very similar embeddings) are created at various levels of detail. This means that smaller, more precise groups can be identified, leading to higher-quality cliques. Essentially, reducing the threshold helps in finding finer and more accurate similar groupings of document embeddings.

At step 412, the server system 118 may select a second representative embedding for each of the plurality of second cliques. There are a plurality of embeddings in each clique. Among the plurality of embeddings, one embedding is selected as a second representation embedding (interchangeably referred to as "core point"). Various algorithms can be employed to identify a representative sample file from these groups. The second representative embedding may be selected based on the highest similarity distance, among all the embeddings of the corresponding clique, with an average embedding of the corresponding clique. In an example, initially, a centroid i.e., the average embedding of all embeddings in the group is calculated, and then the embedding having the highest similarity distance with the centroid is selected as the representative sample. This process can be extended to a third or subsequent threshold level, where each new threshold level is lower than the previous threshold level.

Thus, by initially reducing the dataset through density-based clustering, large volumes of data are handled more efficiently. By replacing clusters of points with representative core points at multiple granularities i.e., similarity threshold, the data size is substantially reduced. This process ensures that only the most essential data points are retained for further analysis, which not only speeds up subsequent computational processes but also makes it more feasible to run complex clustering algorithms on the dataset. This reduction in data size translates to less memory usage and faster processing times, which are critical factors in handling large datasets.

Furthermore, this approach helps to mitigate biases in the clustering results caused by the presence of numerous near-duplicate files. Near-duplicate files can skew the clustering process, leading to clusters that are overly influenced by these duplicates rather than the true underlying structure of the data. By using density-based clustering to identify and consolidate these near-duplicates into representative core points, the integrity of the datasets is preserved. This ensures that the final set of clusters reflects more meaningful groupings based on the actual content of the documents rather than being dominated by redundant data points. As a result, the final clusters are more accurate and reliable, providing better insights and facilitating more effective data analysis and decision-making.

Figure 5:
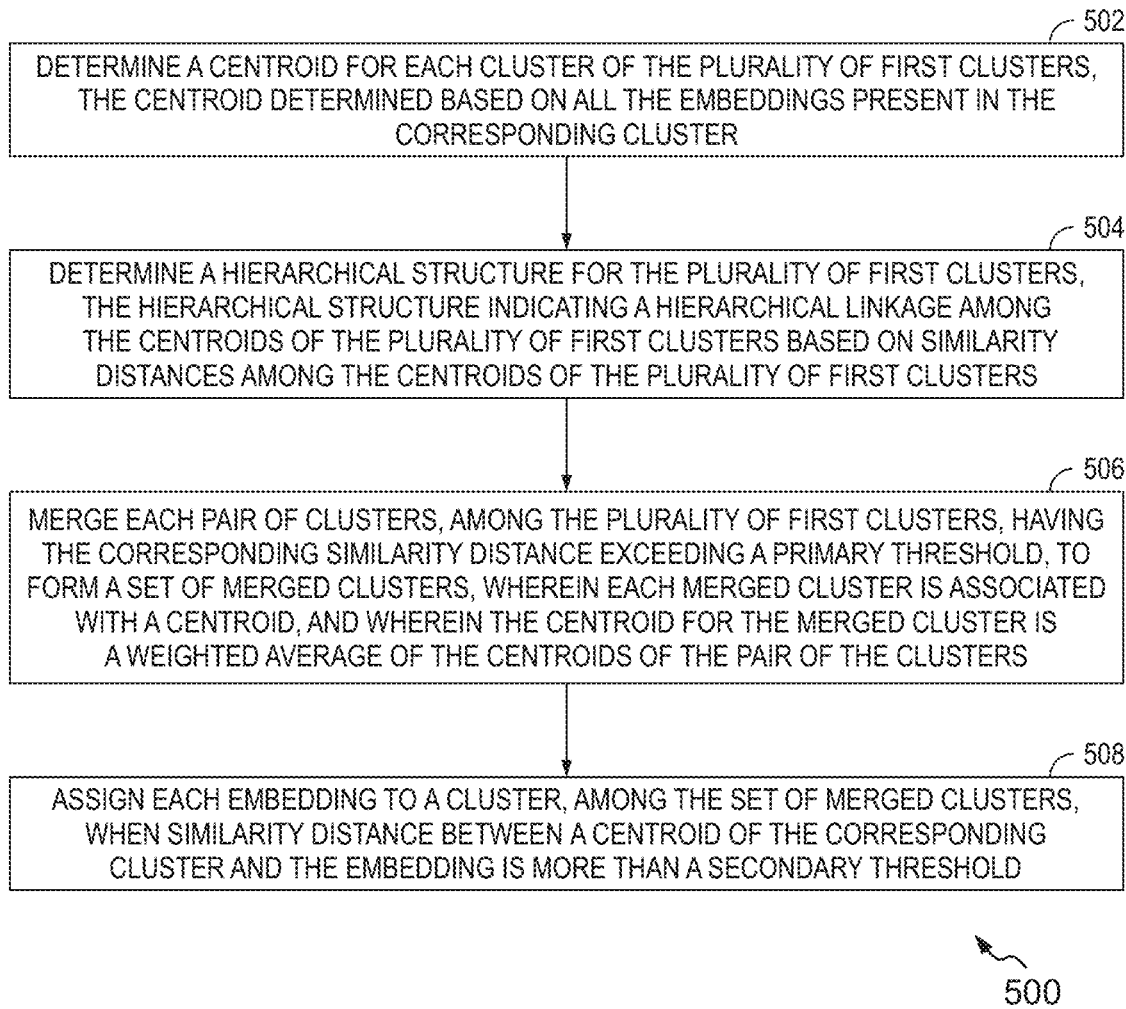
FIG. 5 illustrates a flow chart illustrating a method for generating a plurality of second clusters, in accordance with an embodiment of the present disclosure.

FIG. 5 illustrates a flow chart illustrating a method for generating a plurality of second clusters, in accordance with an embodiment of the present disclosure. Herein, the server system 118 is described with reference to FIG. 1. Operations of a method 500, and combinations of the operations in the method 500, may be implemented by, for example, hardware, firmware, a processor, circuitry, and/or a different device associated with the execution of software that includes one or more computer program instructions. The sequence of operations of the method 500 may not be necessarily executed in the same order as they are presented. Further, one or more operations may be grouped and performed in the form of a single step, or one operation may have several sub-steps that may be performed in parallel or a sequential manner. The method 500 starts with step 502.

At step 502, the server system 118 may determine a centroid for each cluster in the plurality of first clusters. The centroid may be determined based on all the embeddings present in the corresponding cluster. Various methods can be employed to determine the centroid for the cluster. In a non-limiting example, the centroid for the cluster may be determined by calculating an average embedding of each embeddings present in the cluster. Thus, different methods such as median centroid, medoid, geometric median, and so on can also be employed for calculating the centroid.

At step 504, the server system 118 may determine a hierarchical structure for the plurality of first clusters. The hierarchical structure may indicate a hierarchical linkage among the centroids of the plurality of first clusters based on similarity distances among the centroids of the plurality of first clusters. In a non-limiting example, the hierarchical structure may be visually represented through a dendrogram, a tree-type structure formed through the similarity behaviors among the centroids. In an embodiment, the hierarchical linkage can be represented using the distance matrix. The distance matrix can be a mathematical representation of the two-dimensional matrix.

At step 506, the server system 118 may merge each pair of clusters, among the plurality of first clusters, having the corresponding similarity distance exceeding a primary threshold, to form a set of merged clusters. The merged cluster is associated with a centroid. In an embodiment, the centroid for the merged cluster can be calculated as a weighted average of the centroids of the pair of the clusters.

At step 508, the server system 118 may assign each embedding to a cluster, among the set of merged clusters, when the similarity distance between a centroid of the corresponding cluster and the corresponding embedding is more than a secondary threshold. The number of clusters in the plurality of second clusters is less than the number of clusters in the plurality of first clusters. Thus, the second level clustering reduces the number of clusters obtained from the first level clustering.

Figure 6:
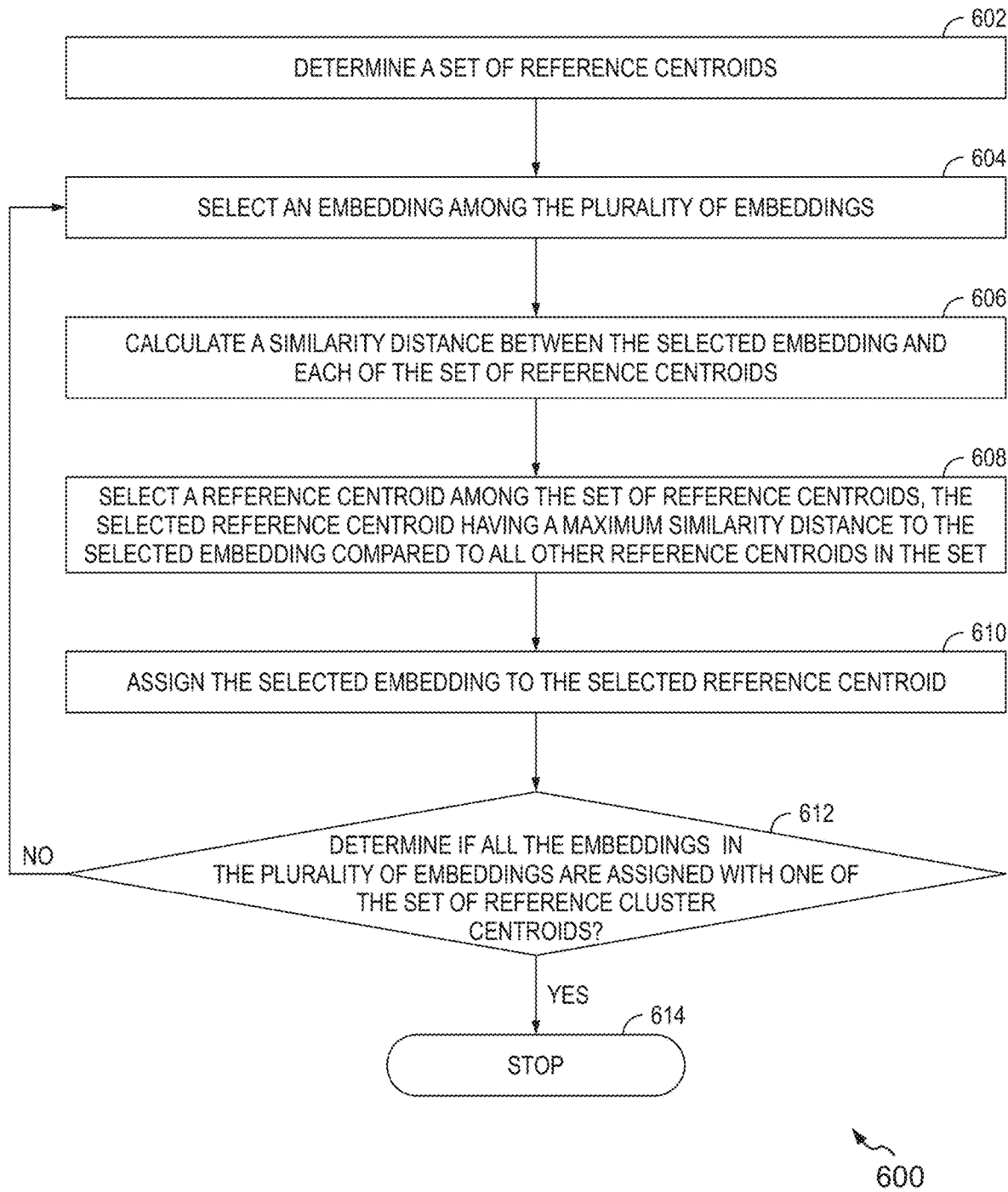
FIG. 6 illustrates a flow chart illustrating a method for generating a plurality of second clusters, in accordance with another embodiment of the present disclosure.

FIG. 6 illustrates a flow chart illustrating a method for generating a plurality of second clusters, in accordance with another embodiment of the present disclosure. Herein, the server system 118 is described with reference to FIG. 1. Operations of a method 600, and combinations of the operations in the method 600, may be implemented by, for example, hardware, firmware, a processor, circuitry, and/or a different device associated with the execution of software that includes one or more computer program instructions. The sequence of operations of the method 600 may not be necessarily executed in the same order as they are presented. Further, one or more operations may be grouped and performed in the form of a single step, or one operation may have several sub-steps that may be performed in parallel or a sequential manner. The method 600 starts with step 602.

Figure 7:
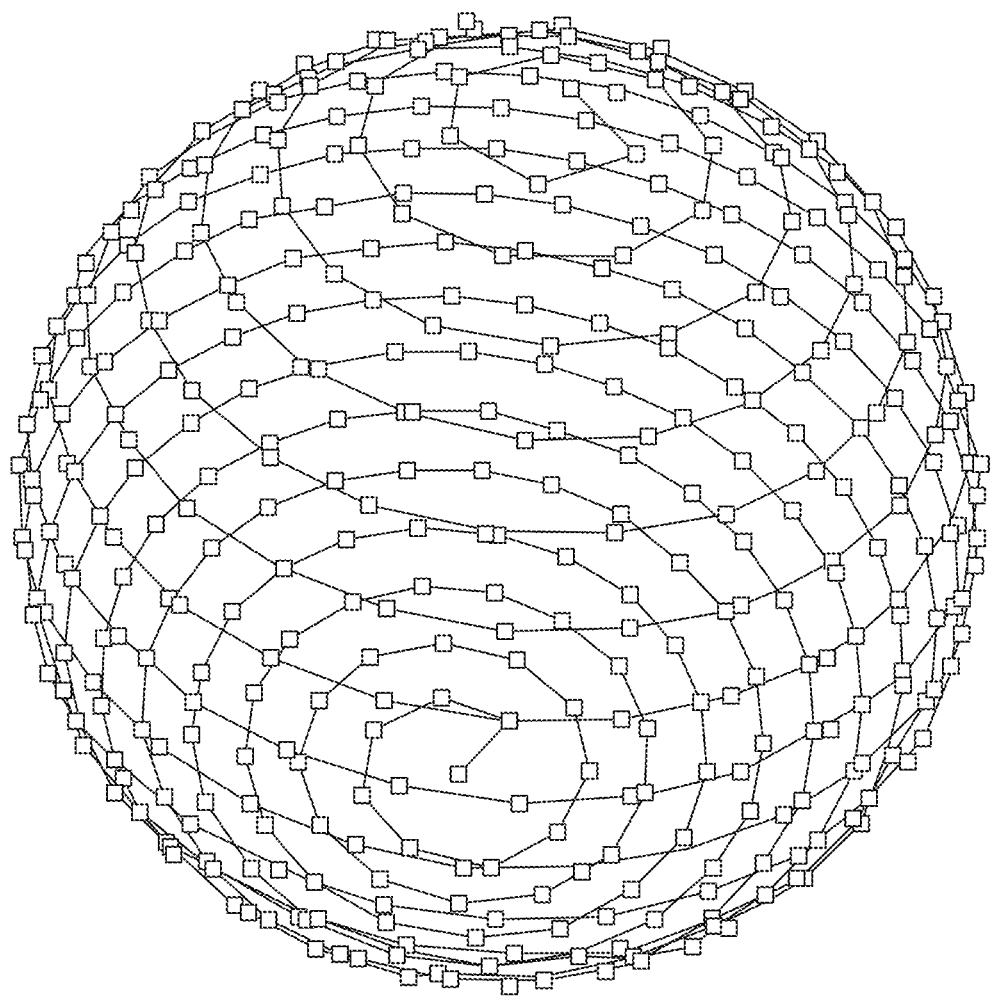
FIG. 7 illustrates a graphical representation of a uniform sample dataset on the surface of a hemisphere in three dimensions, in accordance with embodiments of the present disclosure.

At step 602, the server system 118 determines a set of reference centroids. In an embodiment, the server system 118 may randomly select the set of reference centroids among centroids of the plurality of first clusters. In another embodiment, the set of reference centroids may be determined using heuristics or initialization schemes such as but not limited to k-means++. In an example, the set of reference centroids can be determined by generating uniform spaced points as shown in FIG. 7. Generating uniformly spaced points on the surface of a hypersphere involves transforming the parametric equation of the hypersphere into a hyperspiral. The hypersphere is a multidimensional analog of a sphere, and a hyperspiral is a geometric shape that spirals outward or inward in multiple dimensions. The parameters of the hyperspiral are adjusted such that the points generated along the spiral are equidistant from each other on the surface of the original hypersphere. Equidistant spacing ensures that the points are uniformly distributed across the surface. Thus, transforming the parametric equation of the hypersphere into the hyperspiral and adjusting the spiral parameters allows for the generation of points that are uniformly spaced on the hypersphere's surface.

At step 604, the server system 118 may select an embedding among the plurality of embeddings. The selection of the embedding may be performed randomly.

At step 606, the server system 118 may calculate a similarity distance between the selected embedding and each of the set of reference centroids. The similarity distance is calculated to measure the similarity in semantic characteristics between the selected embedding with each of the reference centroids.

At step 608, the server system 118 may select a reference centroid among the set of reference centroids. The selection of the reference centroid is based on the similarity distance between the selected embedding and each of the set of reference centroids. In particular, the selected reference centroid may have a maximum similarity distance to the selected embedding compared to all other reference centroids in the set.

At step 610, the server system 118 may assign the selected embedding to the selected reference centroid. Thus, the document is then assigned to the cluster with the closest centroid, i.e., the centroid with the smallest distance to the document's embedding.

At step 612, the server system 118 may determine if all the embeddings in the plurality of first clusters is assigned with one of the set of reference centroids. In case of positive determination, the method stops at step 614. Otherwise, the method 600 repeats 604-612 until all the embeddings in the plurality of embeddings are assigned with one of the set of reference centroids. In other words, the method 600 stops when each embedding in the plurality of embeddings is assigned with a reference centroid.

In this manner, this method facilitates forming clusters based on a standardized or predefined set of criteria rather than being tailored to the specific characteristics of each dataset. This streamlined approach not only accelerates the data analysis process but also enhances the reliability and accuracy of conclusions drawn, facilitating comparisons within a consistent and standard framework. This standardization allows for easy comparison and analysis, as each cluster has a consistent definition and purpose across all datasets. In summary, when the nature of clusters formed is no longer dependent on the dataset being analyzed, it ensures that the clustering process is uniform, consistent, and efficient, facilitating better data analysis and comparison across different datasets. In an example, documents from different clients can be assigned to a standardized set of clusters, simplifying the comparison and analysis across diverse datasets. This standardization is particularly advantageous in environments handling multiple client datasets, ensuring a uniform structure for clustering.

FIG. 7 illustrates a graphical representation of a uniform sample dataset on the surface of a hemisphere in three dimensions, in accordance with embodiments of the present disclosure. FIG. 7 can assist in determining the set of reference centroids as described in step 602. Generating points uniformly spaced on the surface of the hypersphere involves transforming the parametric equation of the hypersphere into the hyperspiral. The hypersphere is a multidimensional analog of a sphere, and the hyperspiral is a geometric shape that spirals outward or inward in multiple dimensions. The parameters of the hyperspiral are adjusted such that the points generated along the spiral are equidistant from each other on the surface of the original hypersphere. Equidistant spacing ensures that the points are uniformly distributed across the surface. Thus, transforming the parametric equation of the hypersphere into the hyperspiral and adjusting the spiral parameters allows for the generation of points that are uniformly spaced on the hypersphere's surface, thereby determining a set of reference centroids as described in step 602.

Figure 8:
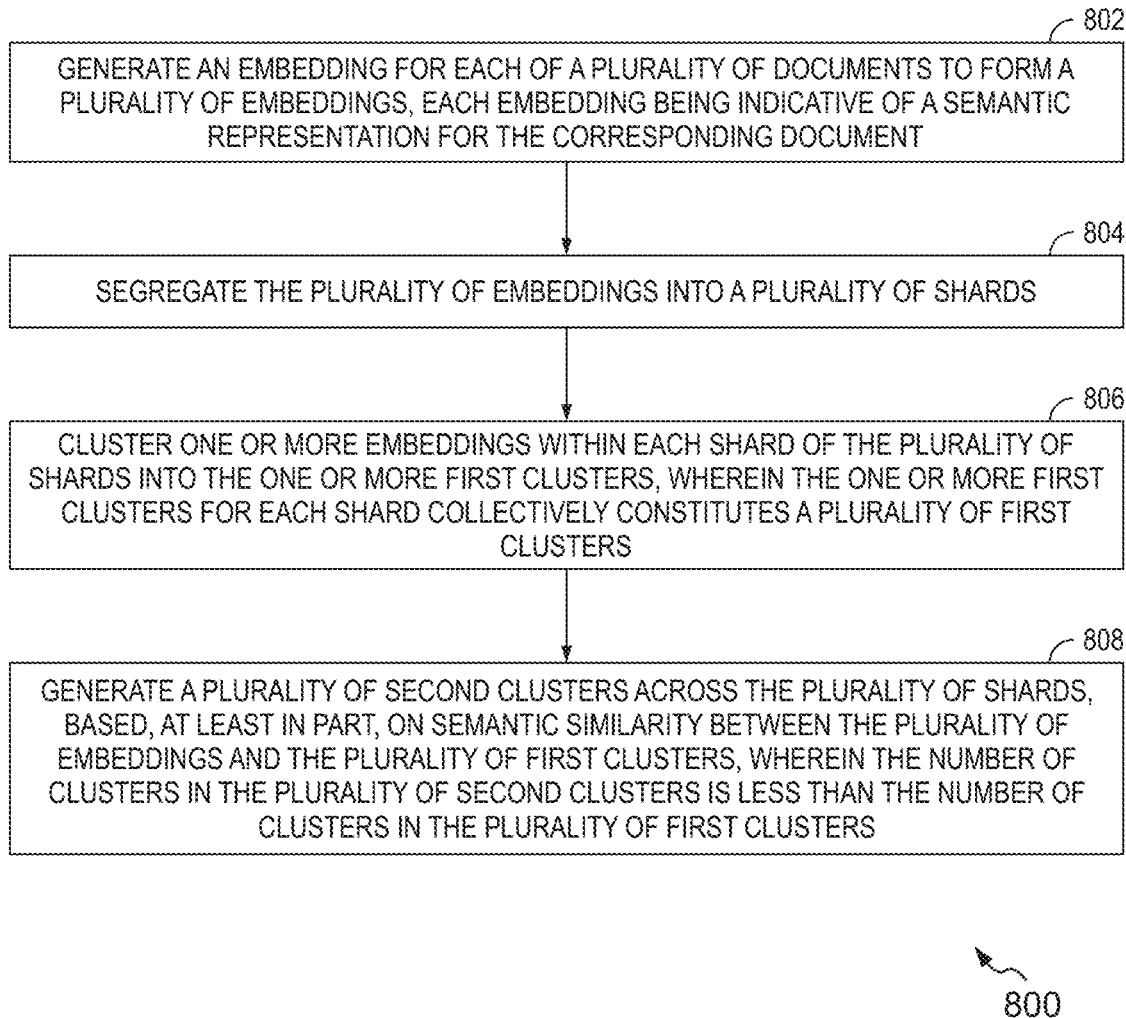
FIG. 8 is a flow diagram of a computer-implemented method for clustering documents according to semantic similarity, in accordance with an embodiment of the present disclosure.

FIG. 8 is a flow diagram of a computer-implemented method 800 for clustering documents according to semantic similarity, in accordance with an embodiment of the present disclosure. The method 800 depicted in the flow diagram may be executed by, for example, the at least one server system such as the server system 118. Operations of the flow diagram of the method 800, and combinations of operations in the flow diagram of the method 800, may be implemented by, for example, hardware, firmware, a processor, circuitry, and/or a different device associated with the execution of software that includes one or more computer program instructions. The method 800 starts at operation 802.

At 802, the method 800 includes generating an embedding for each of a plurality of documents to form a plurality of embeddings. Each embedding is indicative of a semantic representation for the corresponding document.

At 804, the method 800 includes segregating the plurality of embeddings into a plurality of shards.

At 806, the method 800 includes clustering one or more embeddings within each shard of the plurality of shards into the one or more first clusters. The one or more first clusters for each shard collectively constitute a plurality of first clusters.

At 808, the method 800 includes generating a plurality of second clusters across the plurality of shards, based, at least in part, on semantic similarity between the plurality of embeddings and the plurality of first clusters. For instance, the centroids of the plurality of first clusters are determined and a further set of centroids is determined based on the centroids of the plurality of first clusters by using appropriate clustering algorithms. The number of clusters in the plurality of second clusters is less than the number of clusters in the plurality of first clusters.

In addition to grouping documents in clusters, it is advantageous to provide additional context as to the nature of the documents that have been grouped into clusters. In an example, upon clustering the documents in the plurality of second clusters, for each cluster, the server system 118 may determine all the cliques that have been identified within the cluster. Further, for each clique, the server system 118 may aggregate various types of metadata from all the documents. In an embodiment, the meta data can include but not limited to, file names, file paths, file owners, keyphrases from each file's content, etc.

For each clique and each metadata type, the server system 118 may identify the top-k most "salient" values, where k is a predefined number. In an example, for file names and file paths, the salient value can be defined as the most common substring or the longest common substring that are present in a minimum number of files. Such substrings can be computed using a variety of algorithmic approaches such as dynamic programming and suffix trees. In another example, file owners and keyphrases, the salient value can be the most common value encountered. The salient metadata values for each clique within the cluster are collected and presented to the user as additional context about the cluster of documents. If no cliques are present in a cluster, the server system 118 may perform the aggregations of salient metadata values for all files present within the cluster.

Thus, the display management module 222 can display the set of documents along with the additional context or the meta data indicating the nature of the documents.

Figure 9:
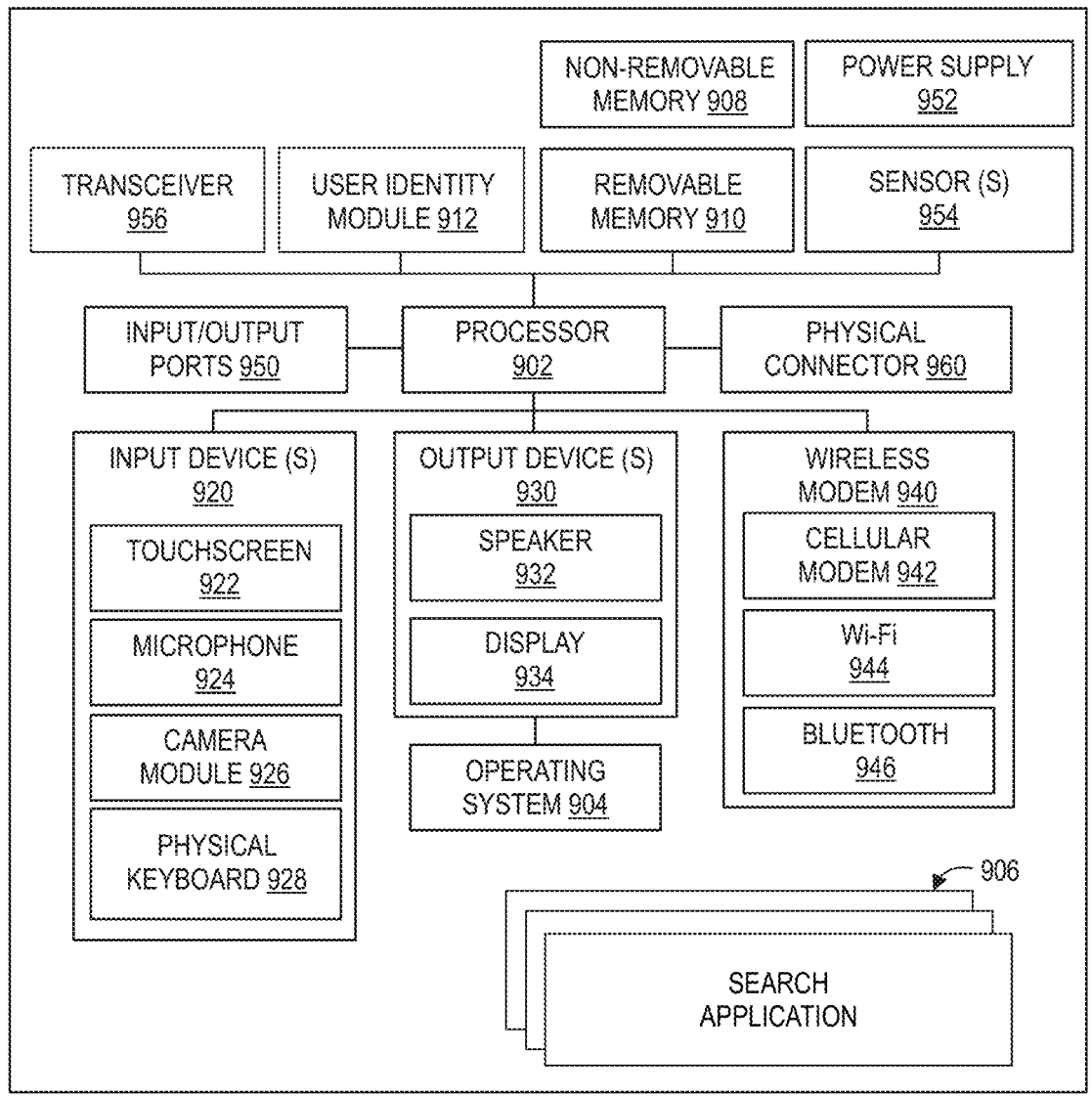
FIG. 9 is a simplified block diagram of a user device, in accordance with various embodiment of the present disclosure.

FIG. 9 is a simplified block diagram of a user device 900 for example, a mobile phone or a desktop computer capable of implementing the various embodiments of the present disclosure. For example, the user device 900 may correspond to the user devices 102-108 of FIG. 1. The user device 900 is depicted to include one or more applications, such as a search application 906 facilitated by the server system 118. The search application 906 can be an instance of an application downloaded from the server system 118 or a third-party server. The search application 906 is capable of communicating with the server system 118 for clustering documents shown in FIG. 1.

It should be understood that the user device 900 as illustrated and hereinafter described is merely illustrative of one type of device and should not be taken to limit the scope of the embodiments. As such, it should be appreciated that at least some of the components described below in connection with the user device 900 may be optional, and thus in an example embodiment may include more, less, or different components than those described in connection with the example embodiment of FIG. 9. As such, among other examples, the user device 900 could be any mobile electronic device, for example, cellular phones, tablet computers, laptops, mobile computers, personal digital assistants (PDAs), mobile televisions, mobile digital assistants, or any combination of the aforementioned, and other types of communication or multimedia devices.

The illustrated user device 900 includes a controller or a processor 902 (e.g., a signal processor, microprocessor, ASIC, or other control, and processing logic circuitry) for performing such tasks as signal coding, data processing, image processing, input/output processing, power control, and/or other functions. An operating system 904 controls the allocation and usage of the components of the user device 900 and supports one or more application programs, such as the search application 906, that implements one or more of the innovative features described herein. In addition to the search application 906, the applications may include common mobile computing applications (e.g., telephony applications, email applications, calendars, contact managers, web browsers, and messaging applications) or any other computing application.

The illustrated user device 900 includes one or more memory components, for example, a non-removable memory 908 and/or a removable memory 910. The non-removable memory 908 and the removable memory 910 may be collectively known as a database in an embodiment. The non-removable memory 908 can include RAM, ROM, flash memory, a hard disk, or other well-known memory storage technologies. The removable memory 910 can include flash memory, smart cards, or a Subscriber Identity Module (SIM). The one or more memory components can be used for storing data and/or code for running the operating system 904 and the search application 906. The user device 900 may further include a user identity module (UIM) 912. The UIM 912 may be a memory device having a processor built in. The UIM 912 may include, for example, a subscriber identity module (SIM), a universal integrated circuit card (UICC), a universal subscriber identity module (USIM), a removable user identity module (R-UIM), or any other smart card. The UIM 912 typically stores information elements related to a mobile subscriber. The UIM 912 in the form of the SIM card is well known in Global Systems for Mobile (GSM) communication systems, Code Division Multiple Access (CDMA) systems, or third-generation (3G) wireless communication protocols such as Universal Mobile Telecommunications System (UMTS), CDMA9000, wideband CDMA (WCDMA) and time division-synchronous CDMA (TD-SCDMA), or with fourth-generation (4G) wireless communication protocols such as LTE (Long-Term Evolution).

The user device 900 can support one or more input devices 920 (hereinafter referred to as "input devices") and one or more output devices 930 (hereinafter referred to as "output devices"). Examples of the input devices 920 may include, but are not limited to, a touch screen/a display screen 922 (e.g., capable of capturing finger tap inputs, finger gesture inputs, multi-finger tap inputs, multi-finger gesture inputs, or keystroke inputs from a virtual keyboard or keypad), a microphone 924 (e.g., capable of capturing voice input), a camera module 926 (e.g., capable of capturing still picture images and/or video images) and a physical keyboard 928. Examples of the output devices 930 may include, but are not limited to, a speaker 932 and a display 934. Other possible output devices can include piezoelectric or other haptic output devices. Some devices can serve more than one input/output function. For example, the touch screen 722 and the display 734 can be combined into a single input/output device.

A wireless modem 940 can be coupled to one or more antennas (not shown in FIG. 9) and can support two-way communications between the processor 902 and external devices, as is well understood in the art. The wireless modem 940 is shown generically and can include, for example, a cellular modem 942 for communicating at long range with the mobile communication network, a Wi-Fi compatible modem 944 for communicating at short range with an external Bluetooth-equipped device, or a local wireless data network or router, and/or a Bluetooth-compatible modem 946. The wireless modem 940 is typically configured for communication with one or more cellular networks, such as a GSM network for data and voice communications within a single cellular network, between cellular networks, or between the user device 900 and a public switched telephone network (PSTN).

The user device 900 can further include one or more input/output ports 950, a power supply 952, one or more sensors 954 (e.g., an accelerometer, a gyroscope, a compass, or an infrared proximity sensor) for detecting the orientation or motion of the user device 900 and biometric sensors for scanning biometric identity of an authorized user, a transceiver 956 (for wirelessly transmitting analog or digital signals) and/or a physical connector 960, which can be a USB port, IEEE 794 (FireWire) port, and/or RS-232 port. The illustrated components are not required or all-inclusive, as any of the components shown can be deleted and other components can be added.

The disclosed methods 300, 400, 500, 600, and 800, or one or more operations of these methods may be implemented using software including computer-executable instructions stored on one or more computer-readable media (e.g., non-transitory computer-readable media, such as one or more optical media discs, volatile memory components (e.g., DRAM or SRAM)), or nonvolatile memory or storage components (e.g., hard drives or solid-state nonvolatile memory components, such as Flash memory components) and executed on a computer (e.g., any suitable computer, such as a laptop computer, netbook, Web book, tablet computing device, smartphone, or other mobile computing device). Such software may be executed, for example, on a single local computer or in a network environment (e.g., via the Internet, a wide-area network, a local-area network, a remote web-based server, a client-server network (such as a cloud computing network), or other such networks) using one or more network computers. Additionally, any of the intermediate or final data created and used during the implementation of the disclosed methods or systems may also be stored on one or more computer-readable media (e.g., non-transitory computer-readable media) and are considered to be within the scope of the disclosed technology. Furthermore, any of the software-based embodiments may be uploaded, downloaded, or remotely accessed through a suitable communication means. Such a suitable communication means includes, for example, the Internet, the World Wide Web, an intranet, software applications, cable (including fiber optic cable), magnetic communications, electromagnetic communications (including RF, microwave, and infrared communications), electronic communications, or other such communication means.

Particularly, the server system 118 and its various components such as the computer system 202 and the database 204 may be enabled using software and/or using transistors, logic gates, and electrical circuits (for example, integrated circuit circuitry such as ASIC circuitry). Various embodiments of the invention may include one or more computer programs stored or otherwise embodied on a computer-readable medium, wherein the computer programs are configured to cause a processor or the computer to perform one or more operations. A computer-readable medium storing, embodying, or encoded with a computer program, or similar language may be embodied as a tangible data storage device storing one or more software programs that are configured to cause a processor or computer to perform one or more operations. Such operations may be, for example, any of the steps or operations described herein. In some embodiments, the computer programs may be stored and provided to a computer using any type of non-transitory computer-readable media. Non-transitory computer-readable media include any type of tangible storage media. Examples of non-transitory computer-readable media include magnetic storage media (such as floppy disks, magnetic tapes, hard disk drives, etc.), optical magnetic storage media (e.g., magneto-optical disks), CD-ROM (compact disc read-only memory), CD-R (compact disc recordable), CD-R/W (compact disc rewritable), DVD (Digital Versatile Disc), BD (BLU-RAY® Disc), and semiconductor memories (such as mask ROM, PROM (programmable ROM), EPROM (erasable PROM), flash memory, RAM (random access memory), etc.). Additionally, a tangible data storage device may be embodied as one or more volatile memory devices, one or more non-volatile memory devices, and/or a combination of one or more volatile memory devices and non-volatile memory devices. In some embodiments, the computer programs may be provided to a computer using any type of transitory computer-readable media. Examples of transitory computer-readable media include electric signals, optical signals, and electromagnetic waves. Transitory computer-readable media can provide the program to a computer via a wired communication line (e.g., electric wires, and optical fibers) or a wireless communication line.

Various embodiments of the invention, as discussed above, may be practiced with steps and/or operations in a different order, and/or with hardware elements in configurations, which are different than those which are disclosed. Therefore, although the invention has been described based on these exemplary embodiments, it is noted that certain modifications, variations, and alternative constructions may be apparent and well within the spirit and scope of the invention.

Although various exemplary embodiments of the invention are described herein in a language specific to structural features and/or methodological acts, the subject matter defined in the appended claims is not necessarily limited to the specific features or acts described above. Rather, the specific features and acts described above are disclosed as exemplary forms of implementing the claims.

What is claimed is:

1. A method for clustering documents according to semantic similarity, the method comprising:
   generating, by a server system, an embedding for each of a plurality of documents to form a plurality of embeddings, each embedding being indicative of a semantic representation for the corresponding document;
   segregating, by the server system, the plurality of embeddings into a plurality of shards;
   clustering, by the server system, one or more embeddings within each shard of the plurality of shards into one or more first clusters, wherein the one or more first clusters for each shard collectively constitute a plurality of first clusters; and
   generating, by the server system, a plurality of second clusters across the plurality of shards, based, at least in part, on semantic similarity between the plurality of embeddings and the plurality of first clusters, wherein the number of clusters in the plurality of second clusters is less than the number of clusters in the plurality of first clusters.

2. The method as claimed in claim 1, wherein generating the plurality of second clusters comprises:
   a. determining a centroid for each cluster of the plurality of first clusters, the centroid determined based on each embedding present in the corresponding cluster;
   b. determining a hierarchical structure for the plurality of first clusters, the hierarchical structure indicating a hierarchical linkage among the centroids of the plurality of first clusters based on similarity distances among the centroids of the plurality of first clusters;
   c. merging each pair of clusters, among the plurality of first clusters, having the corresponding similarity distance exceeding a primary threshold, to form a set of merged clusters, wherein each merged cluster is associated with a centroid, and wherein the centroid for the merged cluster is a weighted average of the centroids of the pair of the clusters; and
   d. assigning each embedding to a cluster, among the set of merged clusters, when similarity distance between a centroid of the corresponding cluster and the embedding is more than a secondary threshold.

3. The method as claimed in claim 1, wherein generating the plurality of second clusters comprises:
   a. determining a set of reference centroids;
   b. selecting an embedding among the plurality of embeddings;
   c. calculating a similarity distance between the selected embedding and each of the set of reference centroids;
   d. selecting a reference centroid among the set of reference centroids, the selected reference centroid having a maximum similarity distance to the selected embedding compared to all other reference centroids in the set;
   e. assigning the selected embedding to the selected reference centroid;
   f. repeating steps (b)-(e) until each embedding in the plurality of embeddings is assigned with one of the set of reference centroids.

4. The method as claimed in claim 1, further comprising assigning, by the server system, a confidence level to each embedding in the plurality of second clusters, wherein the confidence level for each embedding indicates closeness between the corresponding embedding and a centroid of the corresponding cluster.

5. The method as claimed in claim 1, wherein clustering within each shard of the plurality of shards is performed independently from other shards of the plurality of shards.

6. The method as claimed in claim 1, further comprising, prior to clustering within each shard of the plurality of shards, setting, by the server system, the number of clusters in the plurality of first clusters to a particular value.

7. The method as claimed in claim 1, further comprising, prior to clustering embeddings of each of the plurality of shards into one or more first clusters, performing, by the server system, density-based clustering, wherein performing density-based clustering comprises:
   identifying one or more first cliques in each of the plurality of shards, wherein each of the one or more first cliques represents a group of embeddings, with similarity distance between each embedding with at least one embedding within each of the one or more first cliques is greater than a first threshold;
   merging the one or more first cliques within the plurality of shards to form a plurality of first cliques; and
   selecting a first representative embedding for each of the plurality of first cliques to generate a plurality of first embeddings, the first representative embedding being selected based on the highest similarity distance, among all the embeddings of the corresponding clique, with an average embedding of the corresponding clique.

8. The method as claimed in claim 7, wherein performing density-based clustering further comprises:
   upon generation of the plurality of first embeddings, identifying one or more second cliques in each of the plurality of shards, wherein each of the one or more second cliques represents a group of embeddings, with similarity distance between each embedding with at least one embedding within each of the one or more second cliques is greater than a second threshold, and wherein the second threshold is less than the first threshold;
   merging the one or more second cliques within the plurality of shards to form a plurality of second cliques; and
   selecting a second representative embedding for each of the plurality of second cliques, the second representative embedding being selected based on the highest similarity distance, among all the embeddings of the corresponding clique, with an average embedding of the corresponding clique.

9. The method as claimed in claim 7, wherein merging the one or more first cliques within the plurality of shards to form the plurality of first cliques comprises:
   selecting a pair of shards among the plurality of shards;
   generating one or more intermediate first cliques by merging and/or adding the one or more first cliques of the pair of shards according to a predefined criterion;
   updating the one or more intermediate first cliques by merging and/or adding the one or more intermediate first cliques with the one or more first cliques of at least one shard of the remaining shards in the plurality of shards according to the predefined criterion; and
   repeating the step of updation sequentially for each remaining shard.

10. The method as claimed in claim 9, wherein the predefined criterion comprises:
  merge two cliques if similarity distance between at least one embedding of one of two cliques and each of at least two embeddings of another one of two cliques is higher than the first threshold.

11. A server system, the system comprising:
  a memory configured to store instructions;
  a communication interface; and
  a processor in communication with the memory and the communication interface, the processor configured to execute the instructions stored in the memory and thereby cause the server system to perform at least in part to:
  generate an embedding for each of a plurality of documents to form a plurality of embeddings, each embedding being indicative of a semantic representation for the corresponding document;
  segregate the plurality of embeddings into a plurality of shards;
  cluster one or more embeddings within each shard of the plurality of shards into the one or more first clusters, wherein the one or more first clusters for each shard collectively constitute a plurality of first clusters; and
  generate a plurality of second clusters across the plurality of shards, based, at least in part, on semantic similarity between the plurality of embeddings and the plurality of first clusters, wherein the number of clusters in the plurality of second clusters is less than the number of clusters in the plurality of first clusters.

12. The system as claimed in claim 11, wherein, to generate a plurality of second clusters, the processor is configured to:
  determine a centroid for each cluster of the plurality of first clusters, the centroid determined based on each embedding present in the corresponding cluster;
  determine a hierarchical structure for the plurality of first clusters, the hierarchical structure indicating a hierarchical linkage among the centroids of the plurality of first clusters based on similarity distances among the centroids of the plurality of first clusters;
  merge each pair of clusters, among the plurality of first clusters, having the corresponding similarity distance exceeding a primary threshold, wherein each merged cluster is associated with a centroid, and wherein the centroid for the merged cluster is a weighted average of the centroids of the pair of the clusters; and
  assign each embedding to a cluster when similarity distance between a centroid of the corresponding cluster and the embedding is more than a secondary threshold.

13. The system as claimed in claim 11, wherein, to generate a plurality of second clusters, the processor is configured to:
  a. determine a set of reference centroids;
  b. select an embedding among the plurality of embeddings;
  c. calculate a similarity distance between the selected embedding and each of the set of reference centroids;
  d. select a reference centroid among the set of reference centroids, the selected reference centroid having a maximum similarity distance to the selected embedding compared to all other reference centroids in the set;
  e. assign the selected embedding to the selected reference centroid;
  f. repeat steps (b)-(f) until each embedding in the plurality of embeddings is assigned with one of the set of reference centroids.

14. The system as claimed in claim 11, wherein the processor is further configured to assign a confidence level to each embedding in the plurality of second clusters, wherein the confidence level for each embedding indicates closeness between the embedding and a centroid of the corresponding cluster.

15. The system as claimed in claim 11, wherein the processor is configured to cluster within each shard of the plurality of shards independently from other shards of the plurality of shards.

16. The system as claimed in claim 11, wherein the processor is further configured to, prior to clustering within each shard of the plurality of shards, set the number of clusters in the plurality of first clusters to a particular value.

17. The system as claimed in claim 11, wherein the processor is further configured to, prior to clustering embeddings of each of the plurality of shards into one or more first clusters, perform density-based clustering, wherein, to perform density-based clustering, the processor is configured to:
  identify one or more first cliques in each of the plurality of shards, wherein each of the one or more first cliques represents a group of embeddings, with similarity distance between each embedding with at least one embedding within each of the one or more first cliques is greater than a first threshold;
  merge the one or more first cliques within the plurality of shards to form a plurality of first cliques; and
  select a first representative embedding for each of the plurality of first cliques to generate a plurality of first embeddings, the first representative embedding being selected based on the highest similarity distance, among all the embeddings of the corresponding clique, with an average embedding of the corresponding clique.

18. The system as claimed in claim 17, wherein, to perform density-based clustering, the processor is further configured to:
  upon generation of the plurality of first embeddings, identify one or more second cliques in each of the plurality of shards, wherein each of the one or more second cliques represents a group of embeddings, with similarity distance between each embedding with at least one embedding within each of the one or more second cliques is greater than a second threshold, and wherein the second threshold is less than the first threshold;
  merge the one or more second cliques within the plurality of shards to form a plurality of second cliques; and
  select a second representative embedding for each of the plurality of second cliques, the second representative embedding being selected based on the highest similarity distance, among all the embeddings of the corresponding clique, with an average embedding of the corresponding clique.

19. The system as claimed in claim 17, wherein, to merge the one or more first cliques within the plurality of shards to form the plurality of first cliques, the processor is configured to:
  select a pair of shards among the plurality of shards;
  generate one or more intermediate first cliques by merging and/or adding the one or more first cliques of the pair of shards according to a predefined criterion;

update the one or more intermediate first cliques by merging and/or adding the one or more intermediate first cliques with the one or more first cliques of at least one shard of the remaining shards in the plurality of shards according to the predefined criterion; and repeat the step of updation sequentially for each remaining shard, wherein, according to the predefined criterion, the processor is configured to:

merge two cliques if similarity distance between at least one embedding of one of the two cliques and each of at least two embeddings of another one of the two cliques is higher than the first threshold.

20. A method for clustering documents according to semantic similarity across a plurality of entities, the method comprising:

generating, by a server system, an embedding for each of a plurality of documents associated with the plurality of entities to form a plurality of embeddings, each embedding being indicative of a semantic representation for the corresponding document;

segregating, by the server system, the plurality of embeddings into a plurality of shards for each of the plurality of entities;

clustering, by the server system, one or more embeddings within each shard of the plurality of shards into one or more first clusters, wherein clustering the one or more embeddings is performed for each entity separately;

aggregating the one or more first clusters of each shard across the plurality of entities to form a plurality of first clusters; and generating, by the server system, a plurality of second clusters across the plurality of shards, based, at least in part, on semantic similarity between the plurality of embeddings and the plurality of first clusters, wherein the number of clusters in the plurality of second clusters is less than the number of clusters in the plurality of first clusters.

* * * * *